US012706314B2

(12) United States Patent
Mukerjee et al.

(10) Patent No.: US 12,706,314 B2
(45) Date of Patent: Aug. 11, 2026

(54) Fe—N—C CATALYSTS SYNTHESIZED BY NON-CONTACT PYROLYSIS OF GAS PHASE IRON

(71) Applicant: Northeastern University, Boston, MA (US)

(72) Inventors: Sanjeev Mukerjee, Mansfield, MA (US); Qingying Jia, Belmont, MA (US); Li Jiao, Boston, MA (US)

(73) Assignee: Northeastern University, Boston, MA (US)

( * ) Notice: Subject to any disclaimer, the term of this patent is extended or adjusted under 35 U.S.C. 154(b) by 995 days.

(21) Appl. No.: 17/782,688

(22) PCT Filed: Oct. 30, 2020

(86) PCT No.: PCT/US2020/058362
§ 371 (c)(1),
(2) Date: Jun. 6, 2022

(87) PCT Pub. No.: WO2021/118707
PCT Pub. Date: Jun. 17, 2021

(65) Prior Publication Data

US 2023/0039237 A1 Feb. 9, 2023

Related U.S. Application Data

(60) Provisional application No. 62/945,861, filed on Dec. 9, 2019.

(51) Int. Cl.
*H01M 4/90* (2006.01)
*C23C 8/28* (2006.01)
*H01M 4/86* (2006.01)
*H01M 8/10* (2016.01)

(52) U.S. Cl.
CPC ................. *H01M 4/90* (2013.01); *C23C 8/28* (2013.01); *H01M 8/10* (2013.01); *H01M 2004/8689* (2013.01); *H01M 2250/20* (2013.01)

(58) Field of Classification Search
CPC .......... B01J 20/226; H01M 4/90; H01M 8/10; H01M 2004/8689; H01M 2250/20; C23C 8/28
USPC ............................................ 502/5, 185, 200
See application file for complete search history.

(56) References Cited

U.S. PATENT DOCUMENTS

2008/0124603 A1 5/2008 Han
2012/0077667 A1 3/2012 Liu et al.
2014/0371057 A1 12/2014 Serov et al.
2015/0340705 A1 11/2015 Tylus et al.

FOREIGN PATENT DOCUMENTS

CN 108232209 A * 6/2018 .......... H01M 4/9083
CN 111617793 A * 9/2020 .......... H01M 4/9083
WO 2017117410 A1 7/2017

OTHER PUBLICATIONS

Jiao et al., "Chemical Vapor Deposition of Fe—N—C Oxygen Reduction Catalysts with Full Utilization of Dense Fe—N4 Sites", ChemRxiv, Preprint doi.org/10.26434/chrmrxiv.12918983.v1 ,45 pages, Jul. 9, 2020.
Li et al., "The Evolution Pathway from Iron Compounds to Fe1(II)—N4 Sites Through Gas-Phase Iron During Pyrolysis", ChemRxiv, Preprint, 30 pages, Oct. 29, 2019.
Jiao et al., "High-Performance Iron-Based ORR Catalysts Synthesized via Chemical Vapor Deposition", ChemRxiv, Preprint, 19 pages, Oct. 31, 2019.
Thompson et al., "ElectroCat: DOE's Approach to PGM-Free Catalyst and Electrode R&D", © 2018. 22 pages.

* cited by examiner

*Primary Examiner* — Patricia L. Hailey
(74) *Attorney, Agent, or Firm* — Adams & Reese LLP

(57) ABSTRACT

Me-N—C catalysts, wherein Me can include a transition metal, Mn, Fe, Co, or a combination of metals with Me-INU moieties located at the exterior surface of the Me-N—C catalysts are produced by a chemical vapor deposition synthesis. The synthesis methods can utilize non-solid-contact pyrolysis wherein a metal salt can be vaporized. Gaseous metal from the vaporized metal salt can displace a metal M from the N—C zeolitic imidazolate framework. The non-solid-contact pyrolysis does not mix solid iron precursors (e.g., Me═Mn, Fe, or Co) with the solid N—C zeolitic imidazolate framework precursors during or before the synthesis, which improves the process compared to conventional methods.

8 Claims, 26 Drawing Sheets

Counts (a.u.)
Fe $2p_{1/2}$
Fe(3+)
Fe(2+)
Fe $2p_{3/2}$
Fe(3+)
Fe(2+)
Satellite Peaks
Satellite Peaks
735
730
725
720
715
710
705
Binding Energy (eV)

Fe—N—C CATALYSTS SYNTHESIZED BY NON-CONTACT PYROLYSIS OF GAS PHASE IRON

CROSS-REFERENCE TO RELATED APPLICATIONS

This application claims priority to U.S. Provisional Application No. 62/945,861, filed 9 Dec. 2019, which is hereby incorporated by reference in its entirety.

STATEMENT REGARDING FEDERALLY SPONSORED RESEARCH OR DEVELOPMENT

This invention was made with government support under Grant Number DE-EE0008416 awarded by the Department of Energy. The government has certain rights in the invention.

BACKGROUND

Electric vehicles and hybrid electric vehicles are increasingly important for reducing carbon emissions. The global electric vehicle market size was valued at $118,864.5 million in 2017. The market is expected to increase almost five-fold to reach an estimated global market size of 567 billion U.S. dollars by 2025. There is growing use of renewable fuels like biodiesel, bioethanol, and methanol for internal combustion engines, but these generate concerns over emissions of particle pollutants, carbon dioxide, and other gases. Fuel cell vehicles or fuel cell electric vehicles utilize a fuel cell in place of a battery or in combination with a battery or supercapacitor. The fuel cell can generate electricity to power the vehicle motor, typically using oxygen from the air and compressed hydrogen, for long distances. Most fuel cell vehicles emit only water and heat and are classified as zero-emissions vehicles. Hydrogen fuel cell vehicles based on proton exchange membrane fuel cells (PEMFCs) were first commercialized in 2014.

Catalysts used for the oxygen reduction reaction (ORR) in PEMFCs currently are Pt-alloys. The cost of automotive fuel cell systems is still prohibitively high, due primarily to the high loading of Pt on the PEMFC cathode. Thus, there is a need to replace Pt-alloys in such catalysts with earth-abundant, inexpensive materials, i.e., platinum group metal (PGM)-free materials. The leading PGM-free catalysts for the ORR in PEMFCs are single transition metal (Me) atoms, wherein Me=Mn, Fe, or Co embedded in a nitrogen-doped carbon matrix (Me-N—C). However, the ORR activities of such Me-N—C catalysts up to now have been inferior to that of Pt. The Department of Energy has set technical targets for improved future performance of PGM-free catalysts and other components of PEMFCs (Thompson, S T; Wilson, A R, et al., 2018). Thus, there is a need for Me-N—C catalysts with improved activity.

SUMMARY

The present technology provides chemical vapor deposition methods to synthesize Me-N—C catalysts (wherein Me=Mn, Fe, Co, or a combination of metals) utilizing non-solid-contact pyrolysis. For example, an iron precursor, such as anhydrous $FeCl_3$, and an N—C zeolitic imidazolate framework (N—C or N—C zeolitic imidazolate framework) can be placed into two separate containers for pyrolysis, rather than mixed during or before the pyrolysis. The $FeCl_3$ can have a boiling point at about 316° C. Thus, the $FeCl_3$ can be readily evaporated at a temperature of about 750° C. After contacting the N—C zeolitic imidazolate framework substrate, the gas phase $FeCl_3$ incorporates into the N—C zeolitic imidazolate framework substrate, forming dense Fe—$N_4$ sites. The resulting Fe—N—C catalyst exhibits the highest known ORR activity when used in a $H_2$—$O_2$ PEMFC at 0.9 V (FIG. 4). Multiple characterizations (such as inductively coupled plasma, Table 2) show that the high activity can be ascribed to the ultrahigh density of Fe—$N_4$ sites. The N—C zeolitic imidazolate framework can be optimized for the chemical vapor deposition method. Gaseous $FeCl_3$ can be directed towards the N—C zeolitic imidazolate framework. The Me-N—C catalysts disclosed herein can serve as the cathode catalysts in PEMFCs in commercial electric vehicles and in other applications.

Catalysts and cathodes and methods of making catalysts and cathodes disclosed herein can be provided in a range of useful configurations and forms as known in the art of fuel cells, catalysts, electrochemistry, and batteries. For example, the catalyst materials can be deposited as catalyst materials on a cathode.

The present technology can be further summarized by the following list of features.

1. An Me-N—C catalyst comprising Me atoms;
   wherein at least about 90% of the Me atoms in the Me-N—C catalyst are in Me-$N_4$ moieties; and
   wherein a ratio of the Me-$N_4$ moieties located at an exterior surface of the Me-N—C catalyst to the Me-$N_4$ moieties located within the Me-N—C catalyst is in the range from about 90:1 to about 100:1.
2. The Me-N—C catalyst of feature 1, wherein Me is Fe, Mn, Co, or a combination thereof.
3. The Me-N—C catalyst of any one of the preceding features, wherein the Me-N—C catalyst comprises N—C sites; and wherein at least about 99% of the N—C sites at the exterior surface of the Me-N—C catalyst are bound to Me.
4. The Me-N—C catalyst of any one of the preceding features, wherein at least about 90% of the Me-$N_4$ moieties are accessible by a gas-phase contacting the catalyst.
5. The Me-N—C catalyst of any one of the preceding features, wherein at least about 99% of the Me-$N_4$ moieties are accessible by a gas-phase contacting the catalyst.
6. The Me-N—C catalyst of any one of the preceding features, wherein Me is Fe, and the Fe—N—C catalyst comprises not less than about 2 weight % of Fe relative to the total weight of the Me-N—C catalyst.
7. The Me-N—C catalyst of any one of the preceding features, wherein Me is Fe, and wherein the Brunauer-Emmett-Teller area of the Fe—N—C catalyst is at least about 1500 $m^2 \cdot g^{-1}$.
8. The Me-N—C catalyst of any one of the preceding features, wherein Me is Fe, and wherein the electrochemical surface area of the Fe—N—C catalyst is at least about 1800 $m^2/g$.
9. The Me-N—C catalyst of any one of the preceding features, wherein the catalyst is capable of providing an IR-corrected current ≥0.033 $mA \cdot cm^{-2}$ at 0.90 V in an $H_2$—$O_2$ proton exchange membrane fuel cell at about 1.0 bar and 80° C.
10. A cathode for a fuel cell comprising the Me-N—C catalyst of any one of the preceding features.
11. The cathode of feature 10, wherein the fuel cell is a proton exchange membrane fuel cell.

12. A method of making an Me-N—C catalyst, the method comprising:
   (a) providing an N-doped carbon substrate comprising a metal M in $M\text{-}N_4$ moieties;
   (b) contacting the N-doped carbon substrate with a vapor comprising Me, whereby $Me\text{-}N_4$ moieties form on the N-doped carbon substrate and a vapor comprising the metal M is released from the N-doped carbon substrate.
13. The method of feature 12, wherein the vapor comprising Me is a vapor comprising Me(Ha)x, wherein: X is 2, 3, or 4;
   Ha is a halide anion, an organic anion, or a combination thereof; and
   Me is a transition metal.
14. The method of feature 13, wherein Me(Ha)x has a boiling point of less than about 900° C.
15. The method of any one of features 12-14, wherein the vapor comprising Me is carried with an inert gas.
16. The method of any one of features 12-15, wherein the contacting is at a temperature in the range from about 600° C. to about 900° C.
17. The method of feature 16, wherein the temperature is about 750° C.
18. The method of any one of features 12-17, wherein the contacting is for about 3 hours.
19. The method of any one of features 12-18, wherein Me is Fe, Mn, Co, or a combination thereof.
20. The method of any one of features 12-19, wherein Ha is chlorine, bromine, or a combination thereof.
21. The method of any one of features 13-20, wherein Me(Ha)x is $FeCl_3$.
22. The method of any one of features 12-21, wherein the metal M is Zn, Cd, or a combination thereof.
23. The method of feature 22, wherein the metal M is Zn.
24. The method of any one of features 12-23, wherein the vapor comprising the metal M is a vapor comprising M(Ha)x, wherein; X is 2, 3, or 4; and Ha is a halide, an organic anion, or a combination thereof.
25. The method of feature 24, wherein M(Ha)x has a boiling point of less than about 900° C.
26. The method of any one of features 12-25, wherein the vapor comprising M is a vapor comprising $ZnCl_2$.
27. The method of any one of features 12-26, wherein a vapor comprising a halide is released from the N-doped carbon substrate.
28. The method of feature 27, wherein the vapor comprising a halide comprises $Cl_2$.
29. The method of any one of features 13-29, wherein step (b) comprises pyrolyzing the N-doped carbon substrate and a material comprising Me-(Ha)x, wherein X=2-4, such that at least a portion of the Me(Ha)x vaporizes to a vapor comprising Me(Ha)x, whereby the vapor contacts the N-doped carbon substrate and $Me\text{-}N_4$ sites form on the N-doped carbon substrate.
30. The method of feature 29, wherein Me(Ha)x is $FeCl_3$, and Fe—$N_4$ sites form on the N-doped carbon substrate.
31. The method of feature 30, wherein the vapor comprising $FeCl_3$ is provided by vaporizing anhydrous $FeCl_3$ in a furnace.
32. The method of feature 31, wherein the vaporizing comprises placing a material comprising $FeCl_3$ in an inert gas flow upstream of the N-doped carbon substrate.
33. The method of any one of features 12-32, wherein M is Zn and a Zn-halide vapor is released from the N-doped carbon substrate during the formation of $Me\text{-}N_4$ or Fe—$N_4$ sites.
34. The method of feature 33, wherein the Zn-halide is $ZnCl_2$.
35. The method of any one of features 12-34, further comprising purifying the Fe—N—C catalyst.
36. The method of feature 35, wherein the purifying comprises removal of Fe with a magnet.
37. The method of any one of features 12-36, wherein the N-doped carbon substrate is prepared by a method comprising:
   mixing $Zn(NO_3)$ and 2-methylimidazole in a methanol solution until a suspension comprising a zeolitic imidazolate framework eight forms;
   isolating the zeolitic imidazolate framework eight; and
   optionally pyrolyzing the zeolitic imidazolate framework eight.
38. The method of any one of features 12-37, wherein the N-doped carbon substrate is prepared by a method comprising:
   mixing a zeolitic imidazolate framework eight with 1,10 phenanthroline in a solution of ethanol and water to form a solid suspension; and
   pyrolyzing the dried solid suspension under an inert gas.
39. The method of feature 37 or feature 38, wherein the N-doped carbon substrate is prepared by pyrolyzing under an inert gas at about 1050° C. for about one hour.
40. The method of any one of features 12-39, wherein the N-doped carbon substrate has a Brunauer-Emmett-Teller area of at least about 800 $m^2 \cdot g^{-1}$.

As used herein an "inert atmosphere" refers to a gaseous atmosphere that contains little or no oxygen and can include one or more inert or non-reactive gases, such as He, Rd, Ne, Ar, Xe, N, or a combination thereof. The various methods disclosed herein can be carried out, either partially or fully, under an inert atmosphere, which can be under vacuum or under pressure.

As used herein, "pyrolysis" refers to heating of one or more materials at an elevated temperature. Pyrolysis can be performed in an inert atmosphere. Pyrolysis can result in thermal decomposition of one or more compounds or materials. Pyrolysis can result in sublimation, boiling, a chemical reaction, or a combination thereof.

As used herein, "transition metal salts" are metal salts in which the metal ions are transition metal ions, or metals in the d-block of the periodic table of the elements, including the lanthanide and actinide series. Transition metal salts include salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

DETAILED DESCRIPTION

Figure 1A:
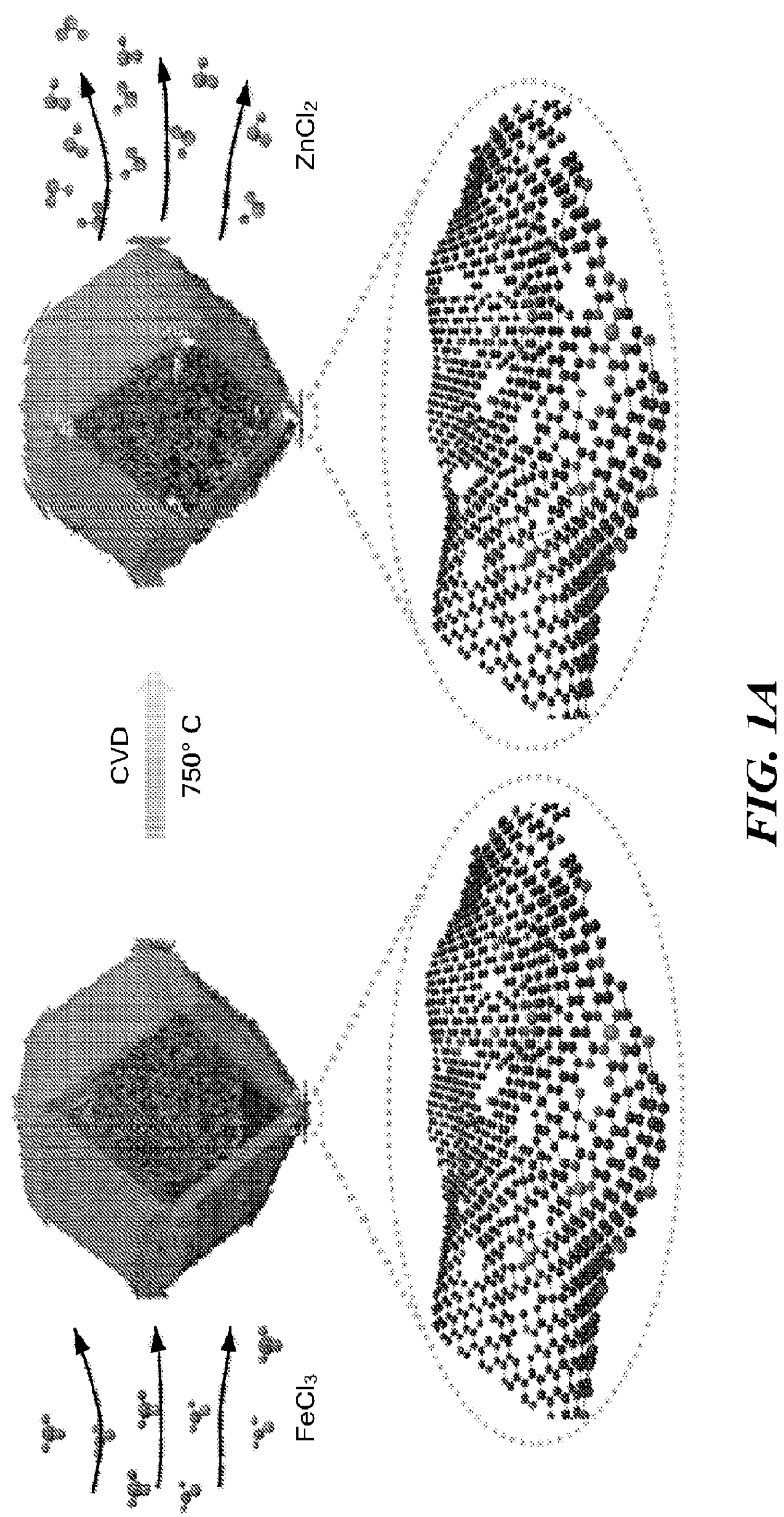
FIG. 1A shows an example of a method for synthesizing Fe—$N_4$ sites by contacting an N—C zeolitic imidazolate framework with gaseous $FeCl_3$ and releasing $ZnCl_2$.

The present technology provides methods directed to chemical vapor deposition (CVD) synthesis of Me-N—C catalysts, wherein Me can include a transition metal, Mn, Fe, Co, or a combination of metals. The methods can utilize non-solid-contact pyrolysis wherein a metal salt can be vaporized. Gaseous metal from the vaporized metal salt can be deposited into N-doped carbon (N—C zeolitic imidazolate framework) defects. Gaseous metal from the vaporized metal salt can displace a metal M from the N—C zeolitic imidazolate framework. The non-solid-contact pyrolysis does not mix solid iron precursors (e.g., Me=Fe) with the solid N—C zeolitic imidazolate framework precursors during or before the synthesis, which improves the process compared to conventional methods.

The non-solid-contact pyrolysis can be conducted at about 750° C., lower than the conventional process at about 1000° C., and the lower temperature can produce more Me-$N_4$ sites. The Me-$N_4$ sites can readily decompose at temperatures of 1000° C. or more. The Me-N—C catalysts formed can have active Fe—$N_4$ sites that are formed via vapor deposition of gas phase $FeCl_3$ into defects in the N—C zeolitic imidazolate framework material. The $FeCl_3$ can displace a metal M from the N—C zeolitic imidazolate framework material. The use of anhydrous $FeCl_3$ as the iron precursor, due to its low boiling point (about 316° C.), can promote the success of the CVD method disclosed herein.

Another key the success of the CVD method is that the N—C zeolitic imidazolate framework can be optimized by preparation at a higher temperature (e.g., about ≥1000-1050° C.) before the CVD process. During the CVD synthesis, the gaseous metal can be directed towards the N—C zeolitic imidazolate framework, for example, by placing the source of the gaseous metal upstream in an inert gas flow from the N—C zeolitic imidazolate framework.

The technology herein can overcome the limits of replacing scarce and expensive platinum (Pt) with metal-nitrogen-carbon (Me-N—C) catalysts for the oxygen reduction reaction in proton exchange membrane fuel cells, which has largely been impeded by the low activity of Me-N—C, in turn limited by low site density and low site utilization. For example, the technology herein can implement chemical vapor deposition to synthesize an Fe—N—C catalyst, in an approach fundamentally different from previous synthetic routes. The technology disclosed herein can close the activity gap between Pt and Fe—N—C catalysts, and thus allows for replacing Pt with inexpensive and earth-abundant materials (e.g., iron) in the PEMFC stack in vehicles. The present catalysts can be used as the cathode catalyst in the PEMFC in hydrogen fuel cells for vehicles and for stationary applications. The catalysts also can be used for $CO_2$ reduction and in direct methanol fuel cells, since they have high ORR activity and immunity to CO poisoning. The catalysts also can be used as the cathode catalyst in alkaline fuel cells.

Me-N—C catalysts can be prepared by providing an N-doped carbon substrate including a metal M in M-$N_4$ moieties. The metal M can be any metal incorporated in a metal organic framework. The N-doped carbon substrate can be contacted with a vapor including a Me-halide, wherein Me is a transition metal (e.g., Mn, Fe, Co, or a combination of metals). The halide can include anions, for example anions including F, Cl, Br, I, At, Ts, or a combination thereof.

When the N-doped carbon substrate is contacted with a vapor including the Me-halide, the metal M in the N-doped carbon substrate (in M-$N_4$ moieties) can be displaced by the metal Me in the Me-halide. Me-$N_4$ moieties can form on an exterior surface of the N-doped carbon substrate. The displacement can include formation of a second metal (M) halide vapor, or M-halide gas. A second M-halide can vaporize from the N-doped carbon substrate. A CVD method can be represented by Reaction 1.

$$\text{Me-Halide (gas)+M-N}_4\text{ (solid)}\rightarrow\text{Me-N}_4\text{ (solid)+M-Halide (g)} \quad \text{Reaction 1}$$

The temperature of the CVD method in Reaction 1 can be selected so that the Me-Halide and the M-Halide form a vapor at the selected temperature. The temperature can be sufficiently low to ensure that the N-doped carbon substrate does not decompose and the Me-$N_4$ (solid) sites do not decompose. For example, if Me=Fe, M=Zinc, and Halide=chlorine, the boiling point of $FeCl_3$ is about 316° C., the boiling point of $ZiCl_2$ is about 732° C., and the boiling point of $Cl_2$ is about −34° C. At a temperature of about 750° C., a vapor including $FeCl_3$ can contact Zn—$N_4$ (solid, in the N—C zeolitic imidazolate framework), react with Zn or displace Zn, and release $ZnCl_2$ gas. $Cl_2$ can also be released as depicted by $\text{Halide}_2$ (gas) in Reaction 2 below.

A variety of oxidation states of the metal M and the transition metal Me can be represented in the example depicted in Reaction 2 below. For example, if the transition metal Me has a +3 oxidation state at the outset, a CVD method can be represented by Reaction 2.

$$\text{2Me-Halide}_3\text{ (gas)+2 M-N}_4\text{ (solid)}\rightarrow\text{2Me-N}_4\text{ (solid)+2 M-Halide}_2\text{ (gas)+Halide}_2\text{ (gas)} \quad \text{Reaction 2}$$

The technology can include anions in addition to halide anions. The halide can include non-halide anions, for example, $SO_4$, $CO_3$, any suitable anion, or a combination thereof. The CVD reaction can include a suitable metal Me with a suitable anion (halide or other anion) vapor, which contacts an N-doped carbon substrate to form a Me-N—C catalyst. The metal M in the N-doped carbon substrate can be displaced by the metal Me. The temperature can be sufficiently high to provide a vapor including the Me-halide (or other anion). For example, $FeSO_4$ can form a gas at about 330° C. A vapor including $FeSO_4$ can contact an N—C zeolitic imidazolate framework including Zn. $ZnSO_4$ can form a vapor at about 740° C. The iron in the vapor including $FeSO_4$ can displace the Zn, to form Me-$N_4$ moieties on the N-doped carbon substrate. Various temperatures can be utilized in the CVD methods. For example, anhydrous $MnSO_4$ boils at about 850° C. A vapor including $MnSO_4$ can contact the N—C zeolitic imidazolate framework. $ZnSO_4$ can form a vapor at about 740° C. The manganese in the vapor including $MnSO_4$ can displace the Zn, to form Me-$N_4$ moieties on the N-doped carbon substrate.

An example of a CVD method is depicted in FIG. 1A. FIG. 1A depicts a vapor including $FeCl_3$ contacting an N—C zeolitic imidazolate framework (left) at about 750° C. Gaseous $ZnCl_2$ is released at the right of FIG. 1A. Although not shown in FIG. 1A, $Cl_2$ gas can be released as Fe displaces Zi from Zi—$N_4$ sites in the N—C zeolitic imidazolate framework. Fe—$N_4$ moieties can form on the exterior of the N—C zeolitic imidazolate framework. The Fe—$N_4$ moieties can be formed at about 750° C., allowing increased nitrogen content and increased Fe—$N_4$ sites. Iron clustering, for example, in Fe particles, can also be minimized. The Fe—$N_4$ sites can be located exclusively or about exclusively on the outer-surface of the N—C zeolitic imidazolate framework material. After the method is conducted, the method can include a step for removing residual Fe, for example, by passing a magnet over the synthesized catalyst.

Figure 1B:
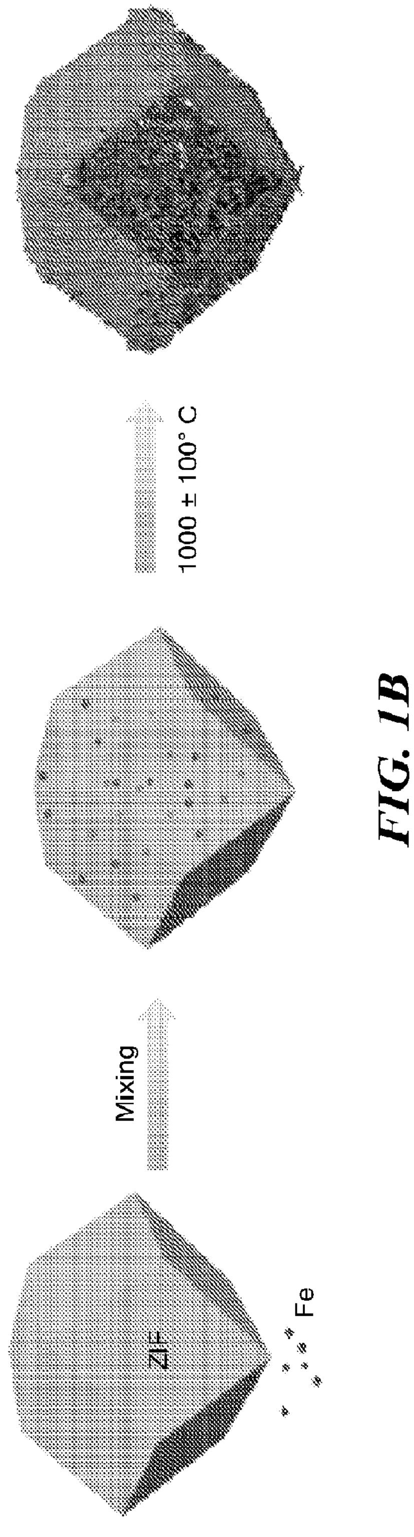
FIG. 1B shows an illustration of a traditional mixing method, not utilizing chemical vapor deposition, wherein Fe is mixed with a zeolitic imidazolate framework, for synthesizing Fe—N—C catalysts.

An example of a traditional mixing method, not utilizing chemical vapor deposition, wherein Fe is mixed with a zeolitic imidazolate framework, for synthesizing Fe—N—C catalysts, is depicted in FIG. 1B. The zeolitic imidazolate framework (ZIF) is mixed with iron at the left of FIG. 1B. The iron is distributed throughout the ZIF at the center of FIG. 1B. Pyrolizing at 1000° C.±100° C. can form some Fe—$N_4$ sites throughout the ZIF (right), with a small proportion of Fe—$N_4$ sites accessible at the exterior surface of the ZIF. The small proportion of Fe—$N_4$ sites accessible at the exterior surface of the ZIF do not provide Fe—$N_4$ sites located exclusively or about exclusively on the outer-surface of the N—C zeolitic imidazolate framework material.

Figure 2A:
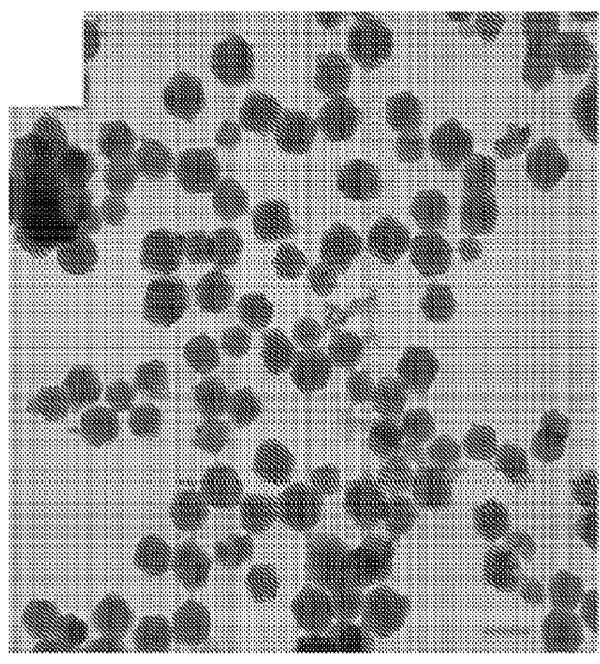
FIG. 2A shows a transmission electron microscope image of a zeolitic imidazolate framework synthesized utilizing the technology herein. The scale bar at lower right is 100 nm.

The N-doped carbon (N—C zeolitic imidazolate framework) utilized for the methods described herein can be made without ball milling the N—C zeolitic imidazolate framework after it has been pyrolized, which can contribute to the performance of the final Me-N—C catalyst. To prepare the N—C zeolitic imidazolate framework, a zeolitic imidazolate framework eight (ZIF-8) can be made by adding an about 0.1 M $Zn(NO_3)\cdot 6H_2O$ methanol solution to an about 0.4 M 2-methylimidazole methanol solution, with stirring for about one hour at room temperature. The resulting suspension can be collected and washed by centrifugation using methanol three times, and later dried at 40° C. in a vacuum oven overnight, to form a ZIF-8. FIG. 2A shows a transmission electron microscope image of a ZIF-8, with a scale bar at lower right of 100 nm. An X-ray diffraction pattern of the synthesized ZIF-8 (FIG. 2B, top) matches that of the pattern in the XRD database (JCPDS: 00-062-1030, FIG. 2B bottom), verifying the formation of ZIF-8.

Figure 2B:
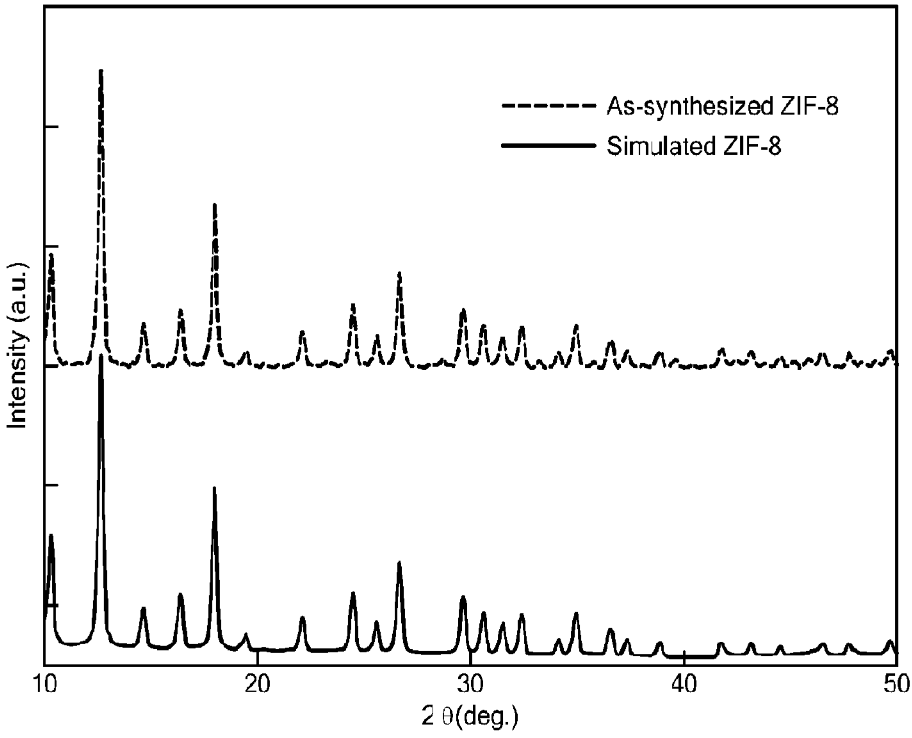
FIG. 2B shows a comparison of an XRD pattern of a synthesized zeolitic imidazolate framework (grey, upper trace) and a simulated XRD pattern for zeolitic imidazolate framework from the Joint Committee on Powder Diffraction Standards (JCPDS) card number 00-062-1030 (black, lower trace).
Figures 2C, 2D:
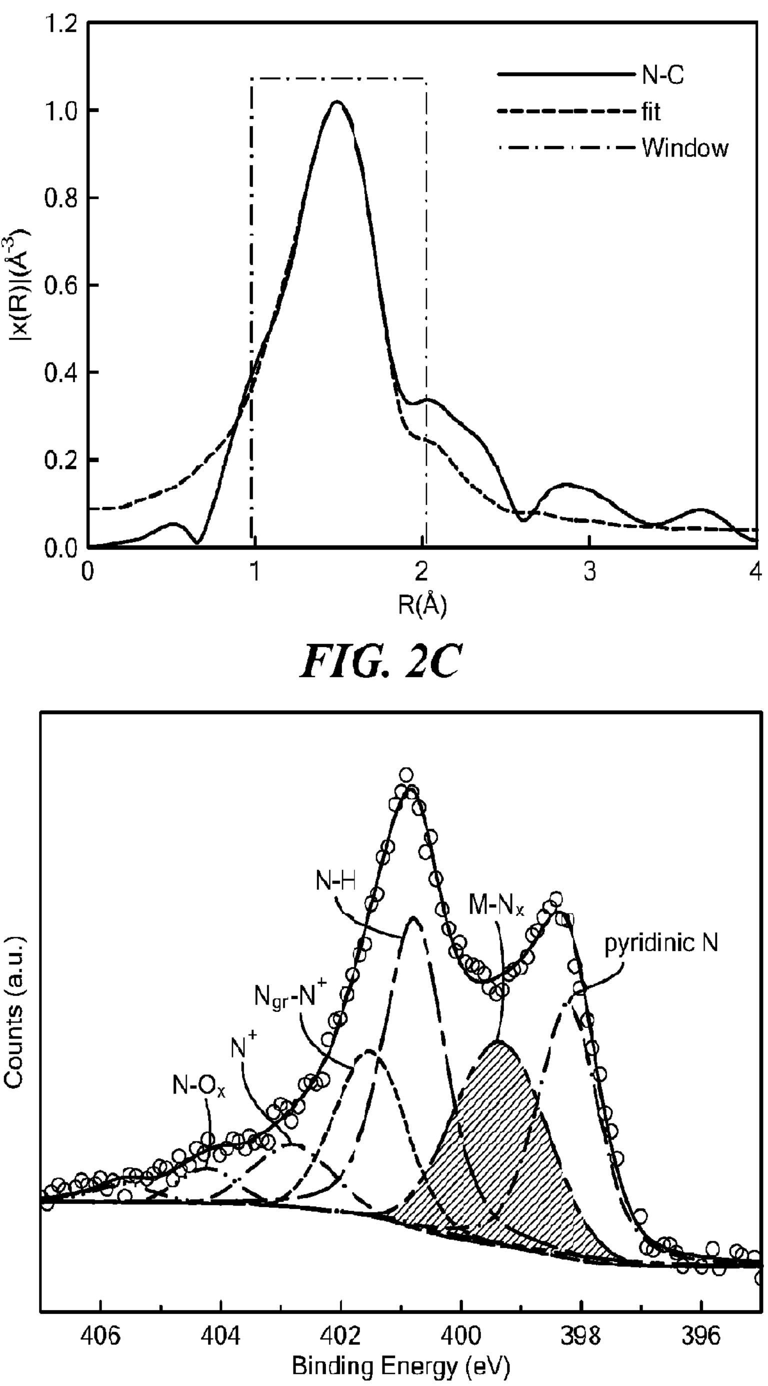
FIG. 2C shows a Zn K-edge FT-EXAFS (Fourier-transform extended X-ray absorption fine structure) spectrum and fit of an N—C zeolitic imidazolate framework.
FIG. 2D shows high-resolution Nis XPS (X-ray photoelectron spectroscopy spectrum) of a N—C zeolitic imidazolate framework.

The ZIF-8 and 1,10 phenanthroline can be dispersed in a solution of ethanol and deionized water with a volume ratio of about 2:1. The suspension can be dried in a vacuum oven overnight. The resulting dry powders can be ball milled for about 3 hours in a plastic container with plastic balls. The resulting powders can be pyrolyzed under an inert gas at 1050° C. for about one hour after reaching 1050° C. with a ramp rate of 5° C. per minute, followed by unassisted cooling to room temperature. The powders collected can be referred to as an N—C zeolitic imidazolate framework and can be used for the subsequent non-solid-contact pyrolysis (CVD method). FIG. 2C depicts fitting of Zn K-edge EXAFS data for a N—C zeolitic imidazolate framework. Table 1 presents the Zn—N bond distance, shown as R(A). As shown in FIG. 2C and in Table 1, fitting of the Zn K-edge EXAFS data for the N—C zeolitic imidazolate framework shows that Zn is present in the form of Zn—$N_4$ with a Zn—N bond distance of 2.00±0.01 Å.

The existence of Zn—N binding in the N—C zeolitic imidazolate framework is also shown by fitting of the X-ray photoelectron spectroscopy (XPS) Nis spectrum shown in FIG. 2D, wherein the shaded peak at ~399.5 eV is commonly assigned to N bonded to a transition metal (Artyushkova, 2020).

Figure 2E:
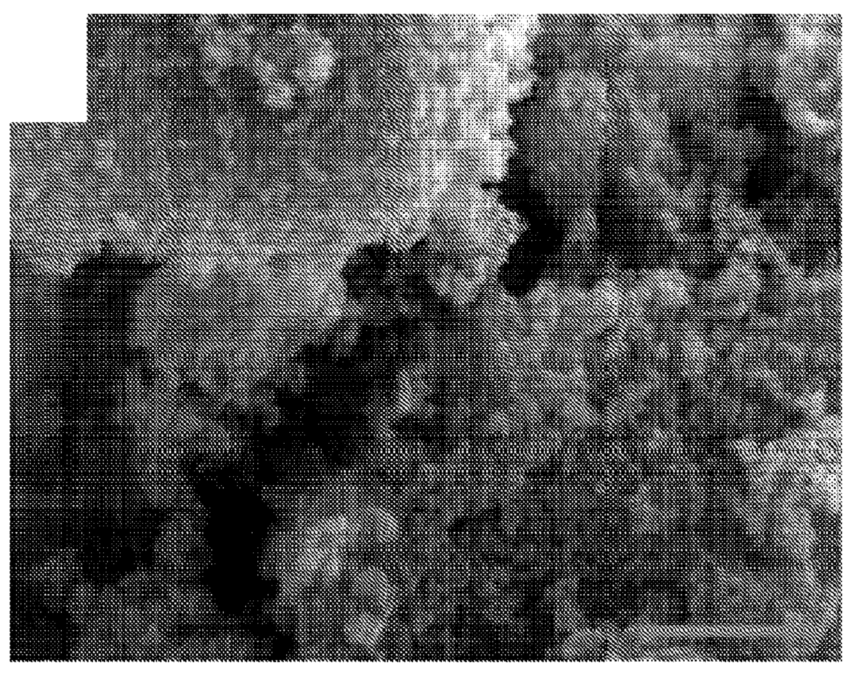
FIG. 2E shows a SEM (scanning electron microscope) image of an N—C zeolitic imidazolate framework. The scale bar at lower right is 1 micron.
Figure 2F:
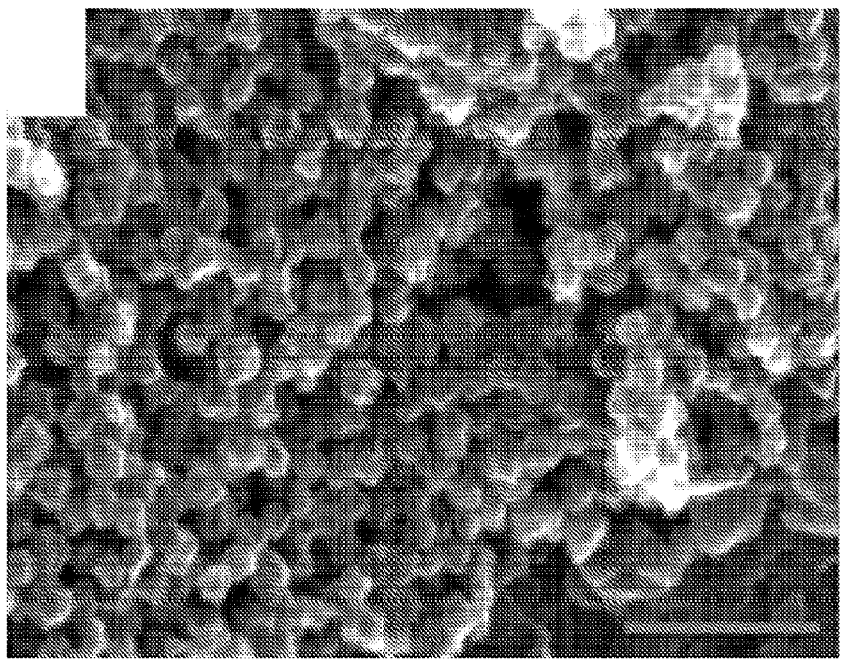
FIG. 2F shows a SEM image of an N—C zeolitic imidazolate framework. The scale bar at lower right is 300 nm.
Figure 2H:
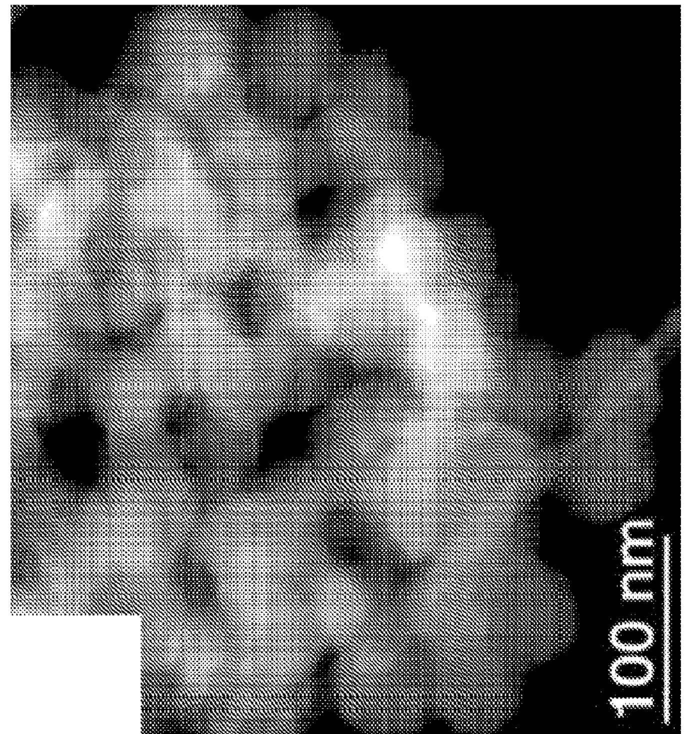
FIG. 2H shows an ADF-STEM image of an N—C zeolitic imidazolate framework with scale bar at lower left of 100 nm.
Figure 2G:
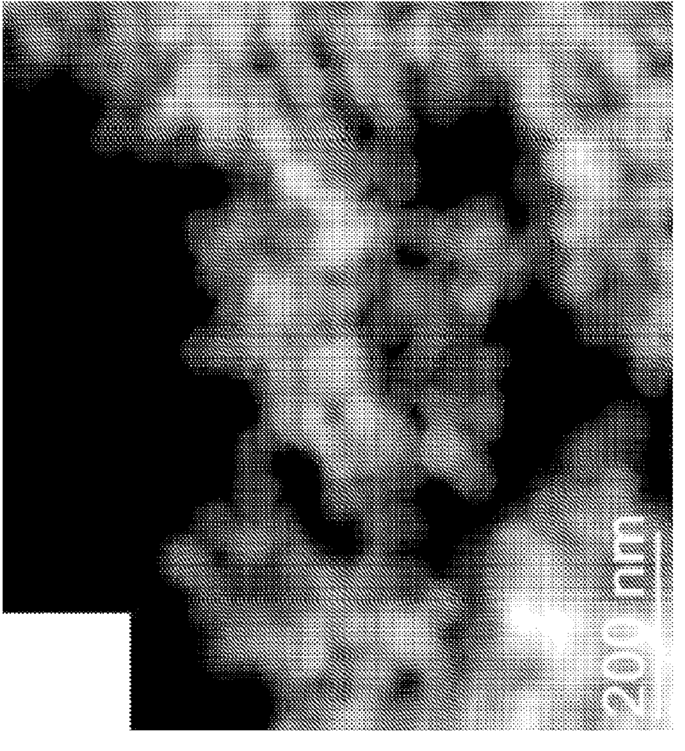
FIG. 2G shows an ADF-STEM (annular dark-field scanning transmission electron microscopy) image of an N—C zeolitic imidazolate framework with scale bar at lower left of 200 nm.
Figure 2J:
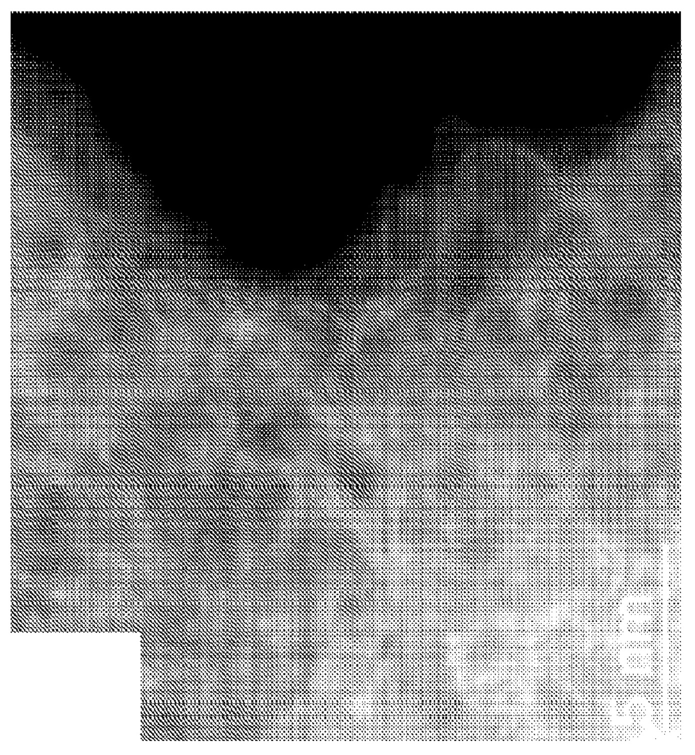
FIG. 2J shows an ADF-STEM image of an N—C zeolitic imidazolate framework with scale bar at lower left of 5 nm.
Figure 2I:
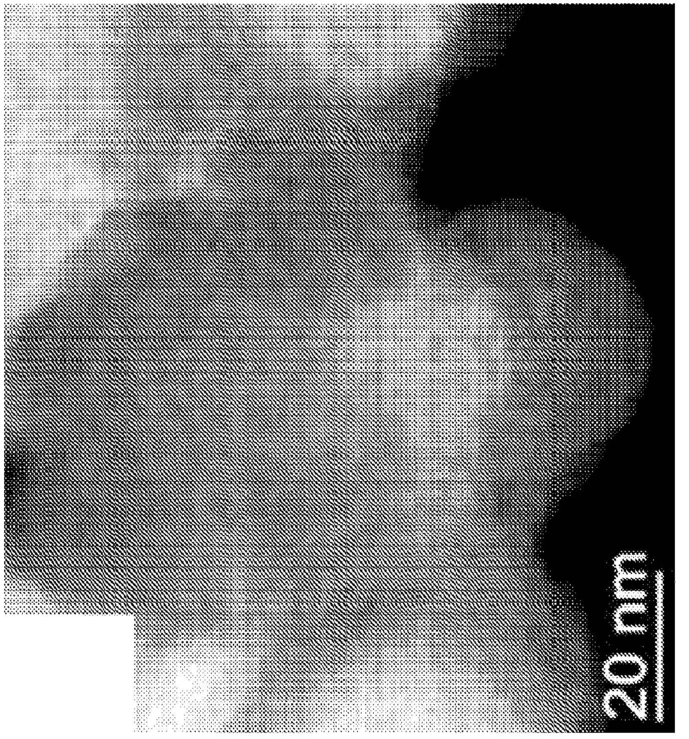
FIG. 2I shows an ADF-STEM image of an N—C zeolitic imidazolate framework with scale bar at lower left of 20 nm.

The scanning electron microscopy images of a N—C zeolitic imidazolate framework shown in FIG. 2E (scale bar at lower right=1 micron) and in FIG. 2F (scale bar at lower right=300 nm) demonstrate that the size and shape of the crystals of ZIF-8 (FIG. 2A) can be preserved after pyrolysis and transformation into N—C zeolitic imidazolate framework particles, despite a possible loss of the mass during formation of the N—C zeolitic imidazolate framework.

Figure 2K:
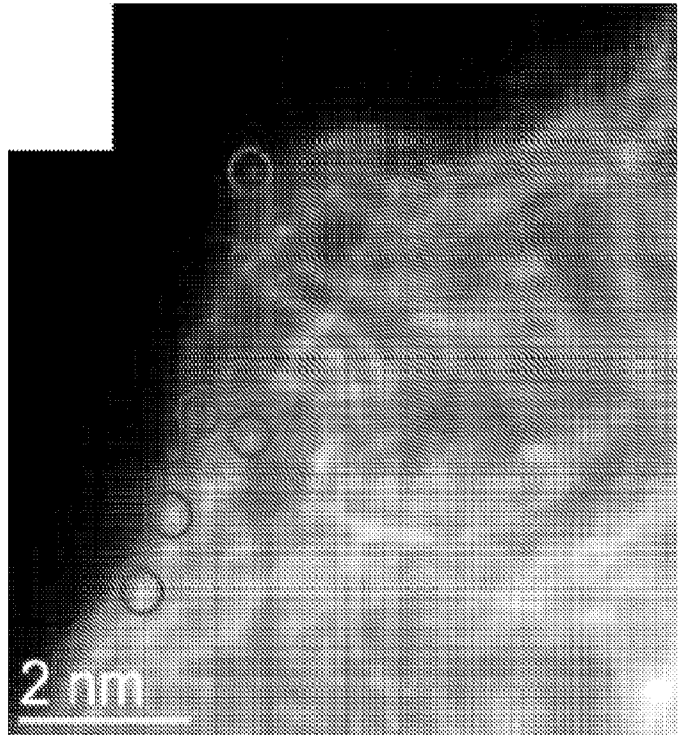
FIG. 2K shows an ADF-STEM image of an N—C zeolitic imidazolate framework, residual Zn atoms are circled, with scale bar at lower left of 2 nm.

Single Zn atoms embedded in the highly porous N—C zeolitic imidazolate framework can be directly visualized using aberration-corrected scanning transmission electron microscopy in annular dark-field images (FIGS. 2G-2K). In FIG. 2K, which has a scale bar of 2 nm, residual Zn atoms are circled. An N—C zeolitic imidazolate framework can include abundant Zn—$N_4$ moieties embedded in a highly porous carbon matrix.

A Me-halide (e.g., $FeCl_3$) can be provided in a gas or vapor that contacts the N—C zeolitic imidazolate framework at a temperature. The temperature can be varied, for example, if vacuum or pressure conditions are utilized for CVD. If different transition metal salts are utilized, the conditions and/or temperatures can be optimized. If a metal M other than Zn is utilized in the N—C zeolitic imidazolate framework, the method can be optimized to provide for displacement of the metal M by the metal Me.

Figure 3:
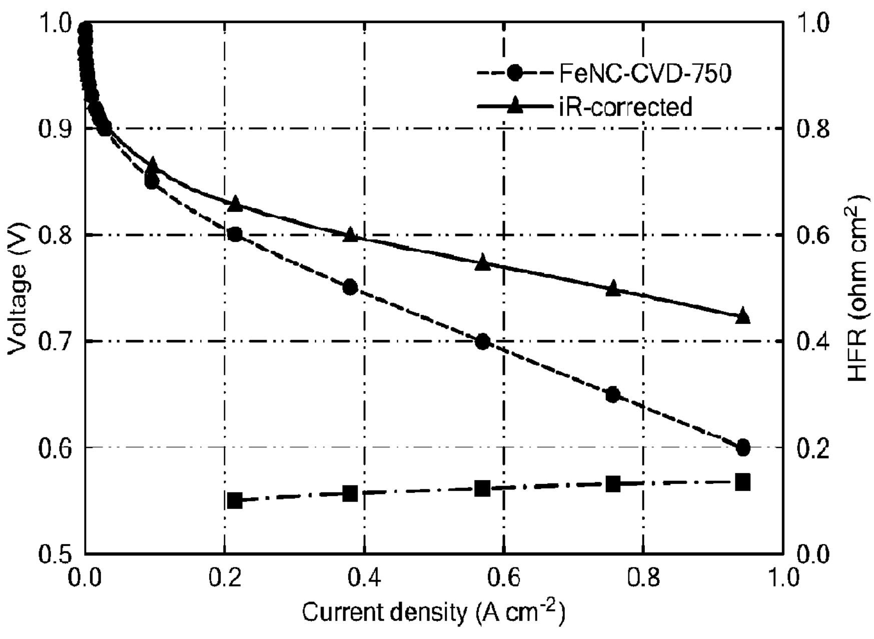
FIG. 3 shows $H_2$—$O_2$ PEMFC polarization curves with and without iR-correction for FeNC-CVD-750. The grey dotted line (bottom trace) represents the high frequency resistance.

To perform non-solid-contact pyrolysis during a CVD method, for example, anhydrous $FeCl_3$ can be placed in a boat in a pyrolysis tube at the upstream of an inert gas flow. The N—C zeolitic imidazolate framework can be placed in another boat in the form of a thin layer in the boat, and the boat is also placed into the pyrolysis tube, with a gap between the two boats. The pyrolysis furnace is heated up to about 750° C. with a ramp rate of 25° C. per minute, and then the temperature is held at about 750° C. for about three hours, followed by cooling down to room temperature naturally. The resulting powders are then collected from the furnace and subjected to purification by, for example, moving a magnet ~0.5 cm above the powders to remove Fe particles. The purified powders can then be utilized as catalysts. FIG. 3 shows the purified powders tested as a catalyst.

Figure 4:
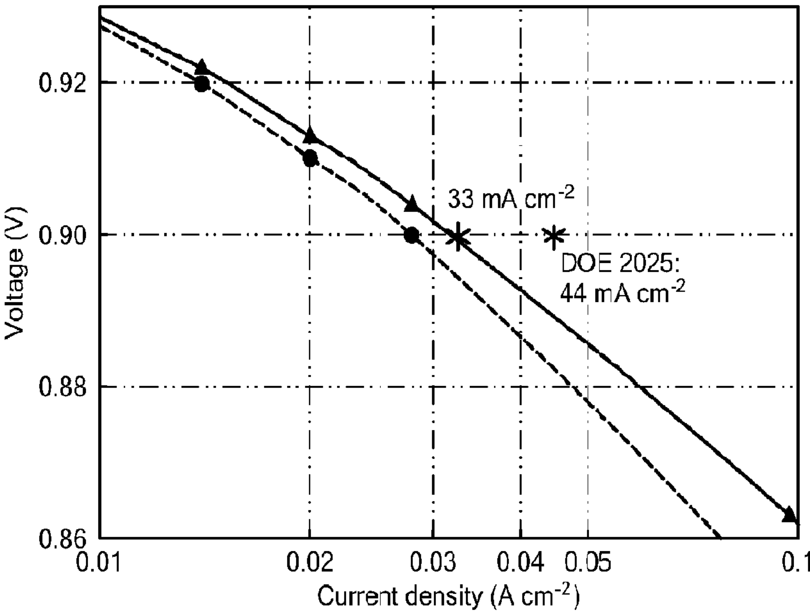
FIG. 4 shows Tafel plots derived from the ORR polarization curves shown in FIG. 3 illustrating the measured ORR activity at 0.9 V versus the DOE 2025 target.

The $H_2$—$O_2$ PEMFC polarization curves with and without IR-correction are shown in FIG. 3 and are measured with the cathode having approximately 6.0 mg-$cm^{-2}$ of the catalyst and an anode having about 0.3 $mg_{Pt}\cdot cm^{-2}$ Pt/C. The membrane is Nafion 212, and 200 mL/min$^{-1}$ gas is fed at both anode ($H_2$) and cathode ($O_2$) with 100% relative humidity and 1.0 bar partial pressure each side. The cell is at 80° C., and the electrode area is 5 cm$^2$. In FIG. 4, the Tafel plot derived from the IR-corrected ORR polarization curve displayed in FIG. 3 is shown to manifest the activity at 0.9 V in comparison with the DOE 2025 target (the DOE 2025 target is 44 mA·cm$^{-2}$ at 0.90 V).

Figures 5A, 5B:
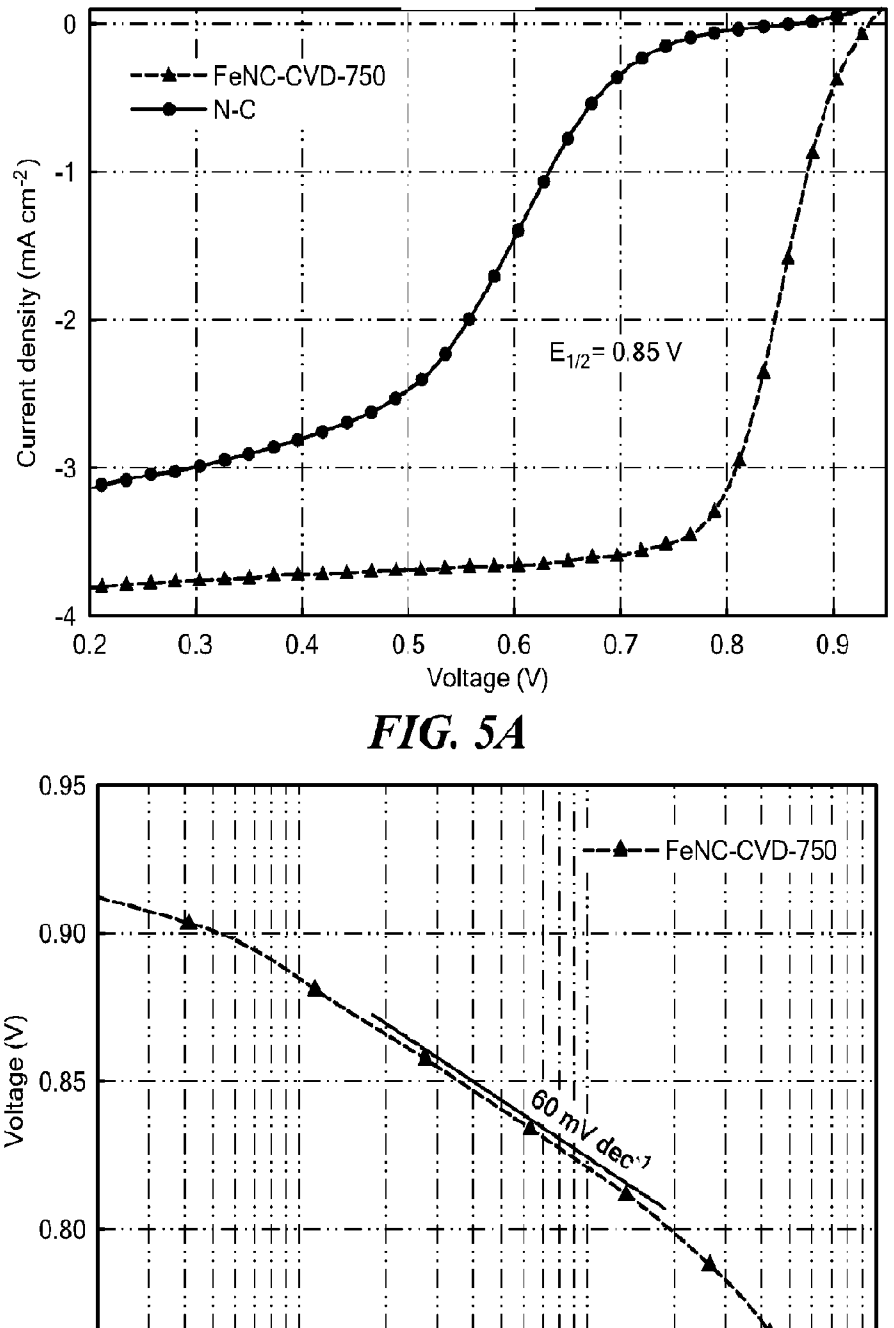
FIG. 5A shows an ORR polarization curve of an FeNC-CVD-750 catalyst, acquired with a steady-state rotating disk electrode (RDE) polarization plot, (lower curve) compared to an ORR polarization curve of an N—C zeolitic imidazolate framework (N—C, upper curve).
FIG. 5B shows a Tafel plot derived from the FeNC-CVD-750 ORR polarization curve shown in FIG. 5A.

When different temperatures, for example 650° C., 750° C., 900° C., and 1000° C. are utilized during contacting an N—C zeolitic imidazolate framework with $FeCl_3$, the catalyst FeNC-CVD-750 (synthesized at 750° C.) exhibits the highest ORR activity (FIG. 10) with a half wave potential of 0.85 V (all potentials are versus reversible hydrogen electrode). To acquire the data shown in FIG. 10, steady-state RDE polarization in $O_2$-saturated 0.5 M $H_2SO_4$ at room temperature using a rotation rate of 900 rpm, 20 mV potential steps from 0.05 to 0.95 V, and a 25 s potential hold time were used at each step. FIG. 5A shows the ORR polarization curve of the FeNC-CVD-750 catalyst (lower curve) compared to the ORR polarization curve of the N—C zeolitic imidazolate framework (N—C, upper curve). The data presented in FIG. 5A was acquired using a catalyst loading of 800 μg·cm$^{-2}$ and oxygen-saturated 0.5 M $H_2SO_4$.

The corresponding kinetic current density for an FeNC-CVD-750 catalyst derived from the current at 0.8 V and the limiting current using the Koutecky-Levich equation is 20 mA·cm$^{-2}$ or 25 A·g$^{-1}$ as depicted in FIG. 5B. The half-wave potential and mass activity values are among the highest reported for PGM-free catalysts in acidic electrolyte (Beltren, D E, and Litster, S, 2019). The kinetic current density exhibits a Tafel slope of ~60 mV/dec above 0.8 V (FIG. 5B), which has been commonly reported for Fe—N—C catalysts (Osmieri, L, et al. 2019; Li, J, et al., 2017). This Tafel slope is comparable to that of Pt-based catalysts (Gasteiger, H A, et al., 2005), indicating that they share the same rate determining step for the ORR.

Figure 5C:
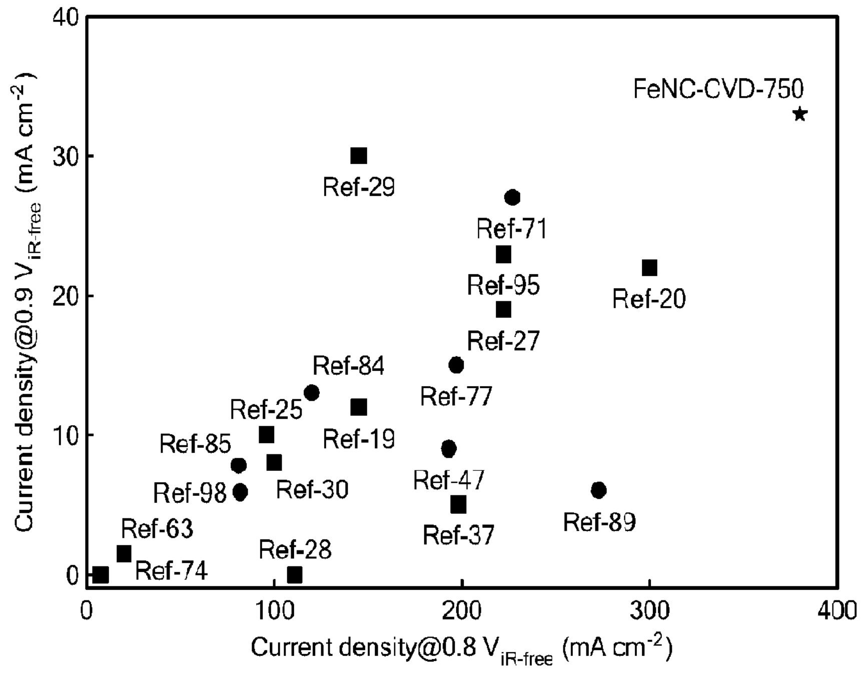
FIG. 5C shows a comparison of the $H_2$—$O_2$ PEMFC activity at 0.9 $V_{iR\text{-}free}$ and 0.8 $V_{iR\text{-}free}$ of FeNC-CVD-750 compared with literature values. The literature values and the corresponding reference numbers shown were directly collected from (Osmieri, L, Park, J, et al. 2020). The data points represented by squares were collected at 100% RH, 1.0 bar partial pressure of $H_2$ and $O_2$, 80° C. The data points represented by circles were collected at 100% RH, 2.0 bar partial pressure of $H_2$ and $O_2$, 80° C.

An FeNC-CVD-750-containing electrode evaluated in an $H_2$—$O_2$ PEMFC for three full polarization scans, followed by acquisition of $H_2$-air polarization curves on the same membrane electrode assembly (MEA) shows unexpected results. A current density of 44 mA·cm$^{-2}$ is reached at 0.89 $V_{iR\text{-}free}$ during the first scan (increasing-current) in the $H_2$—$O_2$ PEMFC at 1.0 bar partial pressure of $O_2$ and 80° C., 0.01 V lower than the DOE 2025 target (FIG. 3 and FIG. 4). In FIG. 3, the cathode includes: ~6.0 mg·cm$^{-2}$ of an FeNC-CVD-750 catalyst; the anode: 0.3 mg$_{Pt}$·cm$^{-2}$ Pt/C; the membrane: Nafion 212; 200 mL·min$^{-1}$ gas fed at the anode ($H_2$) and 1000 mL·min$^{-1}$ at the cathode ($O_2$) at 100% RH, 1.0 bar partial pressure $H_2$ and $O_2$, 80° C., electrode area 5 cm$^2$. A current density of 33 mA·cm$^{-2}$ is achieved at 0.9 $V_{iR\text{-}free}$ and 380 mA·cm$^{-2}$ at 0.8 $V_{iR\text{-}free}$, both exceeding those of all previous PGM-free catalysts reported to date in $H_2$—$O_2$ PEMFCs under similar conditions (FIG. 5C).

Figure 5D:
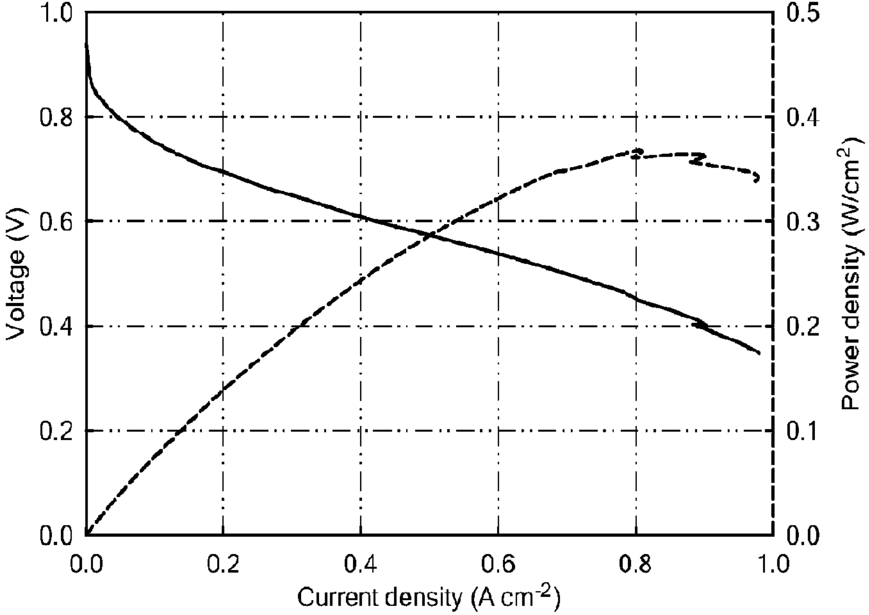
FIG. 5D shows the $H_2$-air PEMFC of an FeNC-CVD-750 catalyst.
Figure 11A:
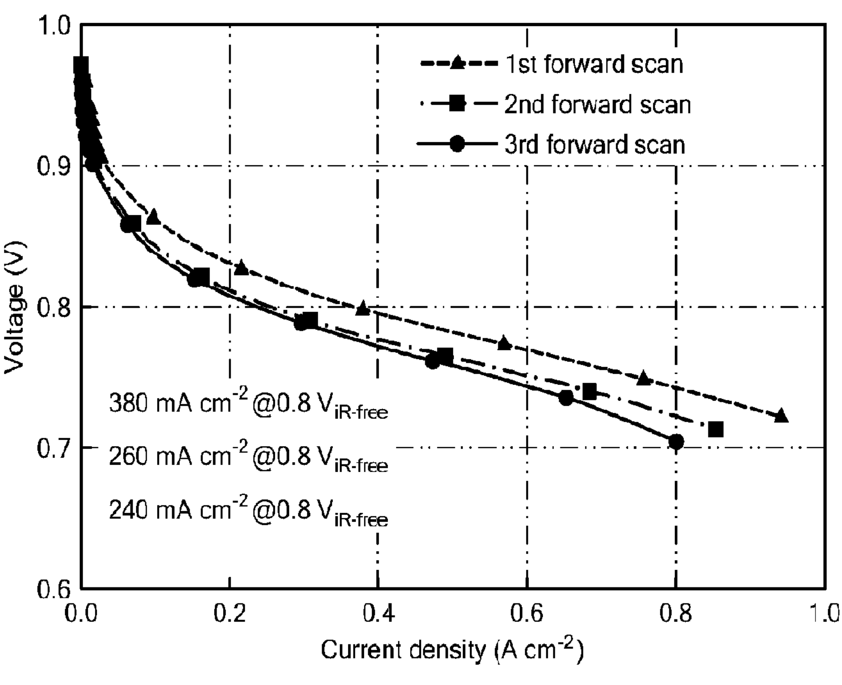
FIG. 11A shows the first three forward scans of the $H_2$—$O_2$ PEMFC polarization with iR-correction for FeNC-CVD-750.
Figure 11B:
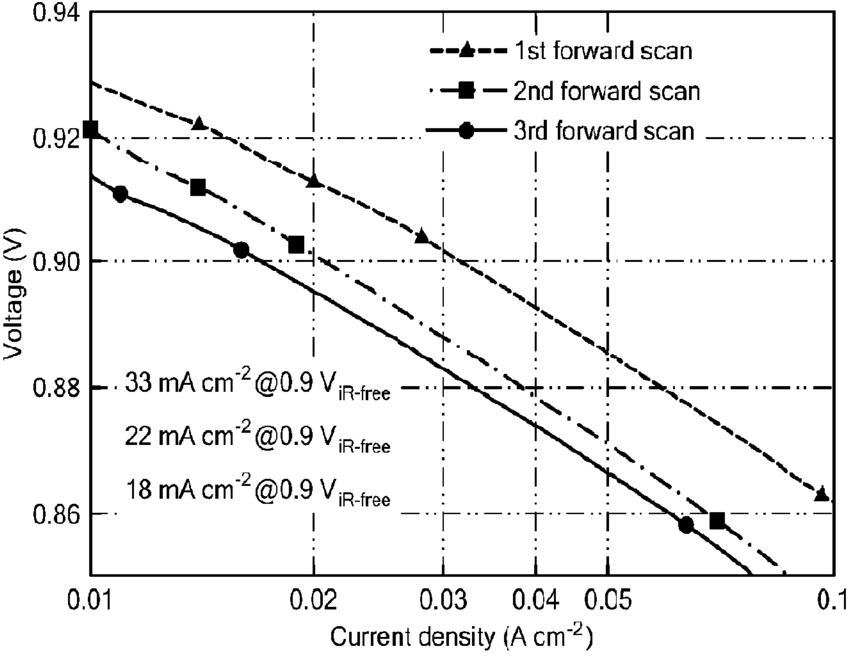
FIG. 11B shows the first three forward scans of the $H_2$—$O_2$ PEMFC polarization with iR-correction enlarged in the 0.86 to 0.94 volt region of the Y-axis of FIG. 11A, for FeNC-CVD-750.

When repeated scans are utilized, the current at 0.9 $V_{iR\text{-}free}$ drops to 22 mA·cm$^{-2}$ and then 18 mA·cm$^{-2}$ on the second and third scans, respectively (FIG. 11A and FIG. 11B) indicating that the FeNC-CVD-750 catalyst has poor stability in $H_2$—$O_2$ PEMFCs, similar to highly active Fe—N—C catalysts (Shao, Y, et al., 2019; Osmieri, L, et al., 2020). The conditions for FIGS. 11A and 11B are cathode: ~6.0 mg·cm$^{-2}$ of the FeNC-CVD-750 catalyst; anode: 0.3 mg$_{Pt}$cm$^{-2}$ Pt/C. This result is expected since Fe—N—C catalysts, including FeNC-CVD-750, can share the same Fe—$N_4$ active sites. Despite the degradation, a maximum power density of 0.37 W·cm$^{-2}$ was obtained in the subsequent $H_2$-air PEMFC testing (FIG. 5D), which is among the highest values reported for PGM-free catalysts thus far.

Figure 6A:
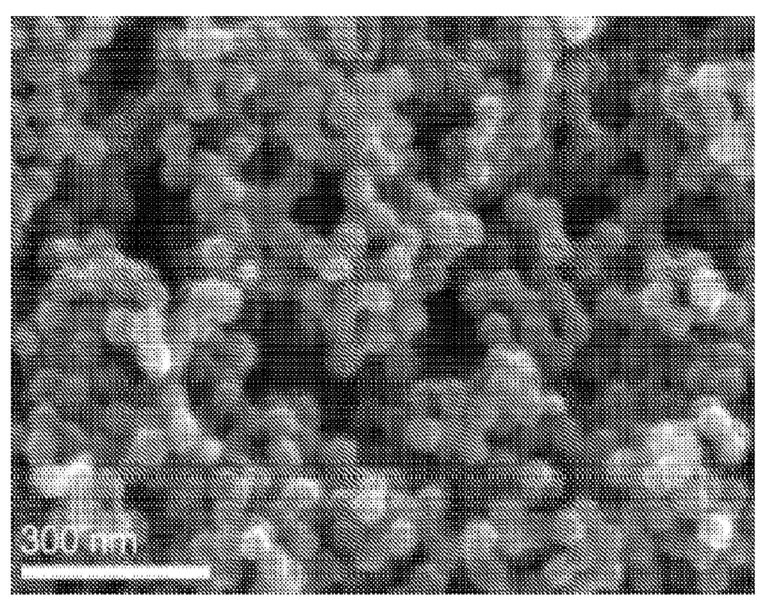
FIG. 6A shows a SEM image of FeNC-CVD-750. The scale bar at lower left is 300 nm.
Figure 6B:
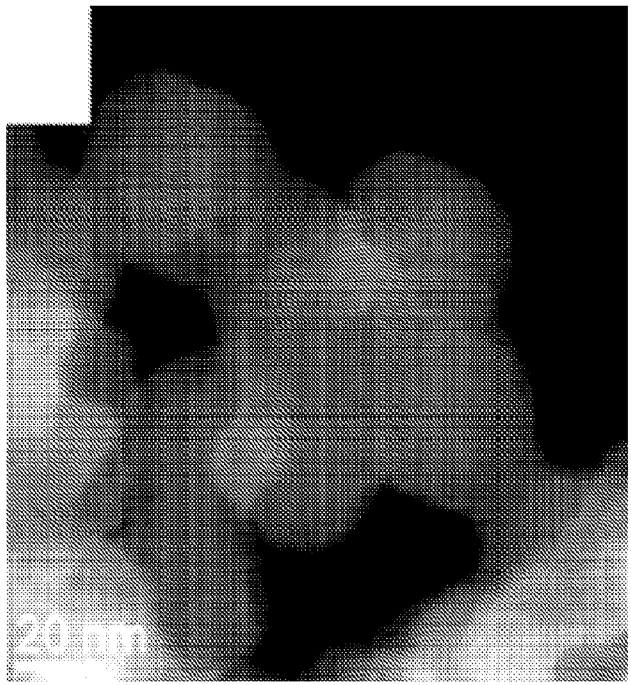
FIG. 6B shows an ADF-STEM image of FeNC-CVD-750. The scale bar at lower left is 20 nm.
Figure 6C:
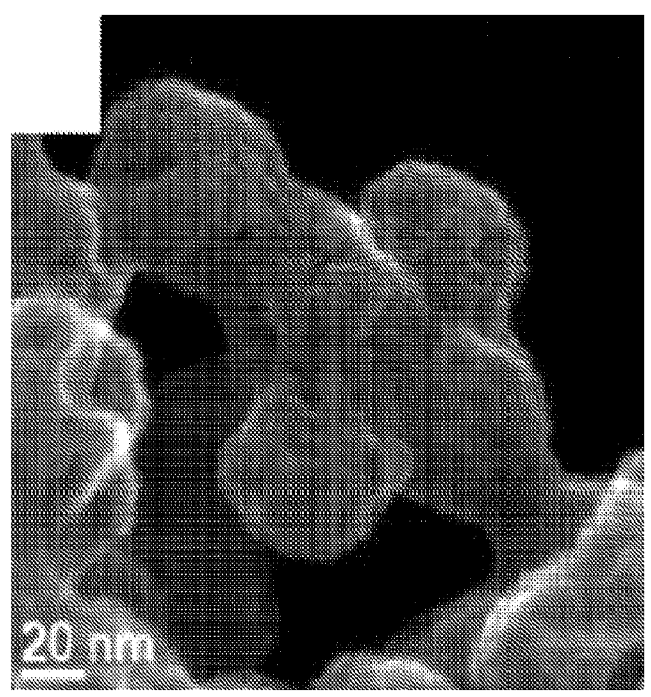
FIG. 6C shows a SE-STEM (secondary electron scanning transmission electron microscopy) image of FeNC-CVD-750. The scale bar at lower left is 20 nm.
Figure 6D:
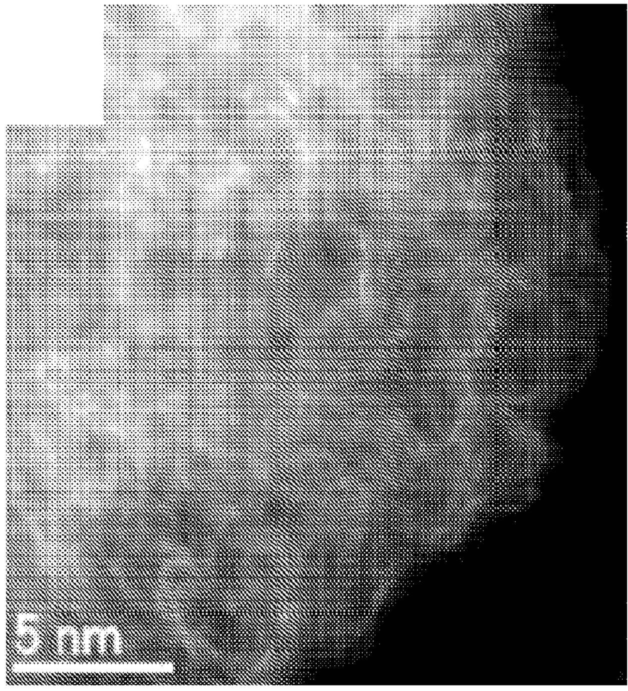
FIG. 6D shows an atomic resolution ADF-STEM image of FeNC-CVD-750. The scale bar at lower left is 5 nm.
Figures 6E, 6F:
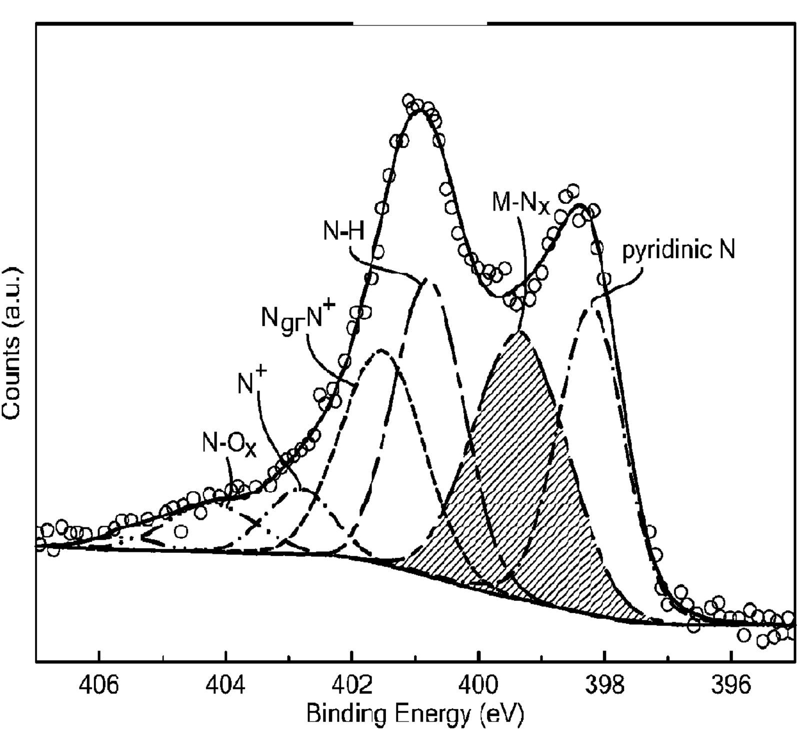
FIG. 6E shows a high-resolution Nis XPS spectrum. Assignments of N species are according to Artyushkova 2020.
FIG. 6F shows a high-resolution XPS $Fe_{2p}$ spectrum fitted with Fe(III) (90%) and Fe(II) (10%) species.
Figure 12A:
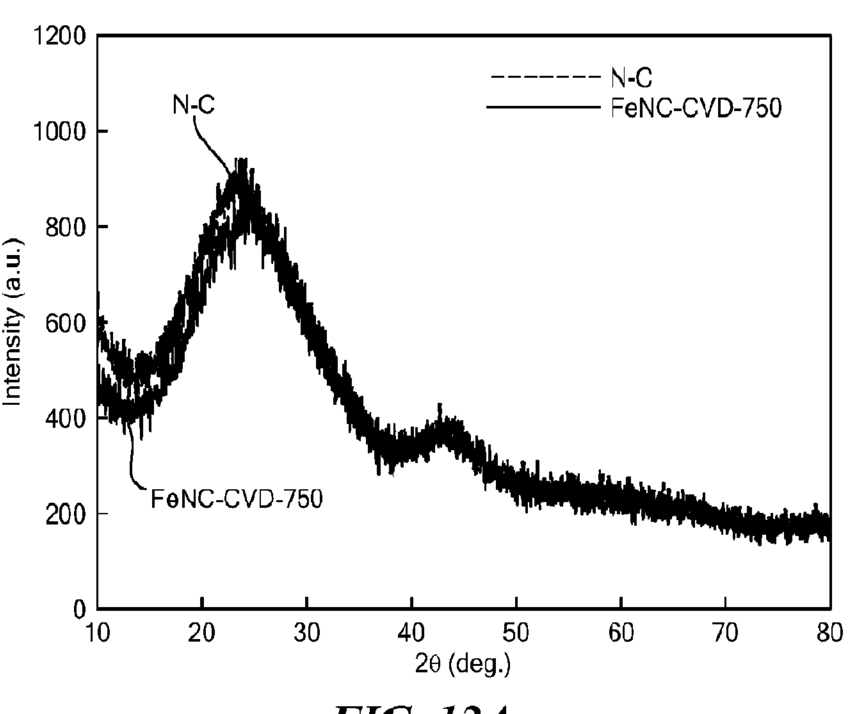
FIG. 12A shows XRD spectra of N—C zeolitic imidazolate framework (upper grey trace) and FeNC-CVD-750 (lower black trace).

A representative SEM image of FeNC-CVD-750 (FIG. 6A) shows a similar powder morphology to the N—C zeolitic imidazolate framework (FIG. 2F), without noticeable particle growth and aggregation. The ADF- and secondary electron (SE)-STEM images, at different magnifications, show the highly porous morphology of the carbon matrix and absence of metal clusters (FIG. 6B-6D). The XPS Nis spectrum of the FeNC-CVD-750 (FIG. 6E) is nearly the same as that of the N—C zeolitic imidazolate framework (FIG. 2D). The XRD pattern of the FeNC-CVD-750 (FIG. 12A) and the N—C zeolitic imidazolate framework ("N—C", FIG. 12A), and the C and N contents (Table 2), are nearly the same, comparing the FeNC-CVD-750 results to those of the N—C zeolitic imidazolate framework. These results show that the overall morphology of the N—C zeolitic imidazolate framework can be largely preserved after the CVD at about 750° C. This can be expected considering that the N—C zeolitic imidazolate framework was synthesized using pyrolysis at about 1050° C. prior to the CVD of Fe. FIG. 6F depicts a high-resolution XPS $Fe_{2p}$ spectrum fitted with Fe(III) (90%) and Fe(II) (10%) species compared to empirically acquired XPS for the FeNC-CVD-750.

Figure 13A:
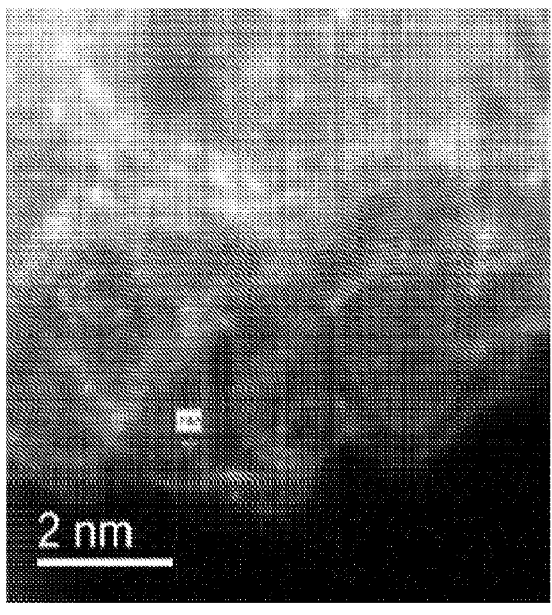
FIG. 13A shows a high resolution ADF-STEM image of FeNC-CVD-750; a square with a crosshair highlights single atoms selected for the EEL spectrum in FIG. 13B. The scale bar at lower left is 2 nm.
Figure 13B:
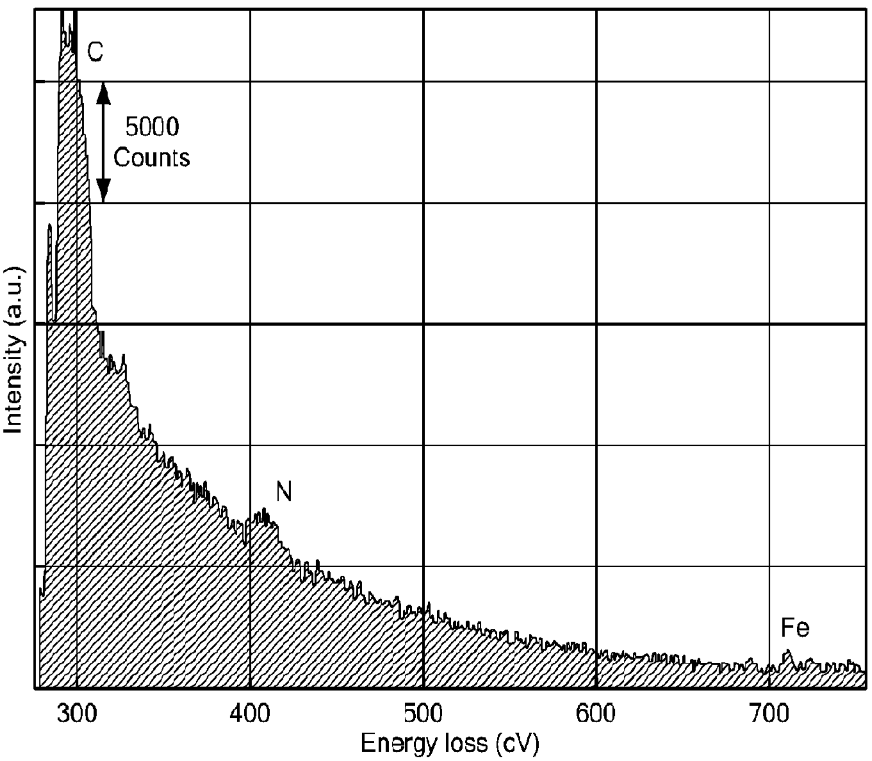
FIG. 13B shows an EEL spectrum of the N k-edge and Fe L-edge acquired from single atoms highlighted in FIG. 13A.

In the FeNC-CVD-750, the Zn content drops from 2.16 wt % in the N—C zeolitic imidazolate framework to 0.12 wt % in FeNC-CVD-750, accompanied by incorporation of 2.00 wt % Fe (see Table 2). The presence of abundant Fe—$N_x$ moieties in FeNC-CVD-750 is directly evidenced by atomic resolution ADF-STEM imaging coupled with electron energy loss spectroscopy (EELS). Abundant bright dots are clearly seen in the ADF-STEM image (FIG. 6G, inset), for which the EELS point spectrum shows the close proximity of single Fe atom and N (FIG. 6G, also FIG. 13A and FIG. 13B).

Figures 6G, 6H:
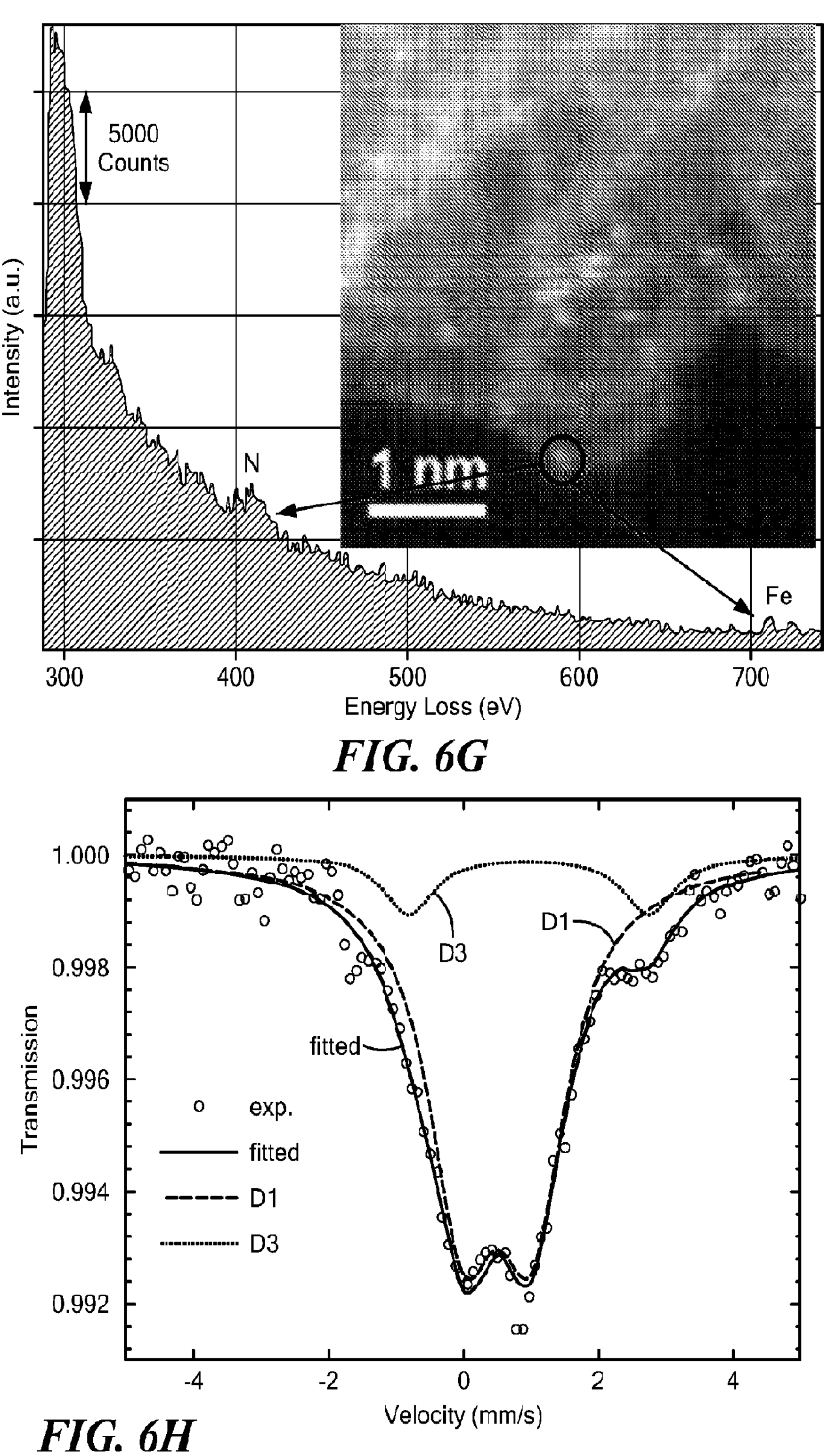
FIG. 6G shows an EEL (electron energy loss) spectrum showing N K-edge and Fe L-edge acquired from single atom (the atom is the circled dot in the inset where the atomic-resolution AC-STEM image is displayed with a scale bar of 1 nm).
FIG. 6H shows a Mössbauer spectrum measured at 5 K fitted with D1 (89%) and D3 (11%).

The presence of Fe—$N_4$ moieties in FeNC-CVD-750 is also supported by the $^{57}$Fe Mössbauer spectrum collected at 5 Kelvin (FIG. 6H). The lowest possible temperature during Mössbauer data acquisition is important to distinguish superparamagnetic Fe species (such as nano-Fe-oxides) from Fe—$N_4$ sites. While both nano-Fe-oxides and $O_2$—Fe(III)—$N_4$ sites lead to a similar D1 signal at room temperature, this degeneracy is usually unveiled at 5 K: nanosized superparamagnetic Fe oxides convert into a sextet component while $O_2$—Fe(III)—$N_4$ sites still contribute with a D1 component (Li, J, Jia, Q, et al., 2019).

Figure 6I:
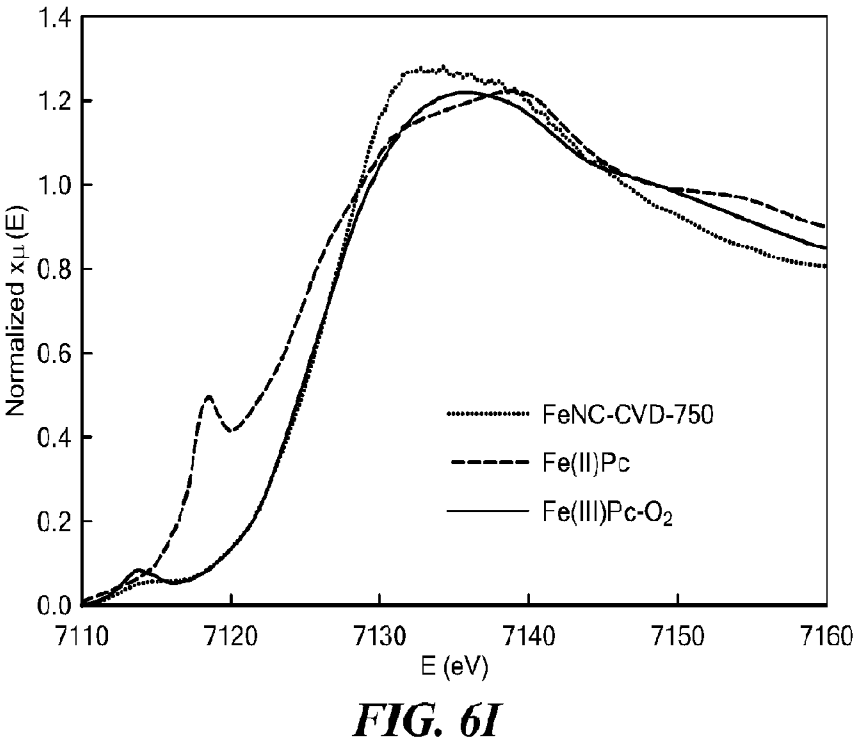
FIG. 6I shows an ex situ XANES (X-ray absorption near edge structure) spectrum of FeNC-CVD-750 with those of Fe(II)Pc and Fe(III)Pc-$O_2$ standards for comparison.
Figure 6J:
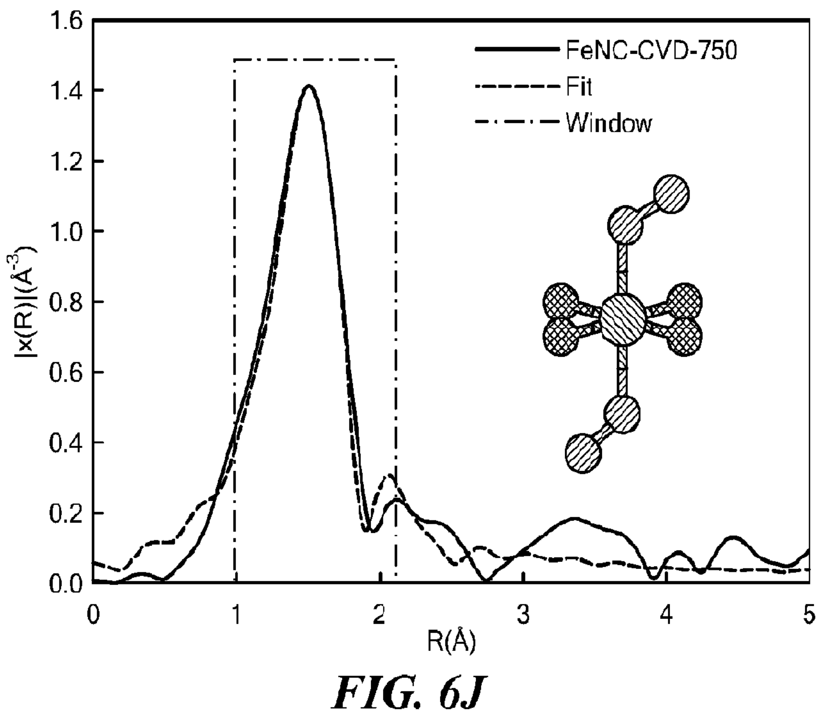
FIG. 6J shows an ex situ FT-EXAFS spectrum of FeNC-CVD-750 and the fit with a molecular model of $O_2$—Fe(III)—$N_4$ depicted in the inset, wherein the center large grey ball represents an iron atom, the darker smaller balls extending at the top and the bottom represent oxygen atoms, and the smaller four grey balls extending axially or horizontally represent nitrogen atoms.

The $^{57}$Fe Mössbauer spectrum at 5K of FeNC-CVD-750 identifies two doublets, labelled D1 and D3, representing 89% and 11% of the absorption area, respectively (FIG. 6H and Table 3). For example, FIG. 6I shows an ex situ XANES spectrum of FeNC-CVD-750 with those of Fe(II)Pc and Fe(III)Pc-$O_2$ standards for comparison. FIG. 6J shows an ex situ FT-EXAFS spectrum of FeNC-CVD-750 and the fit with a molecular model of $O_2$—Fe(III)—$N_4$ depicted in the inset, wherein the center large grey ball represents an iron atom, the darker smaller balls extending at the top and the bottom represent oxygen atoms, and the smaller four grey balls extending axially or horizontally represent nitrogen atoms.

Figure 7A:
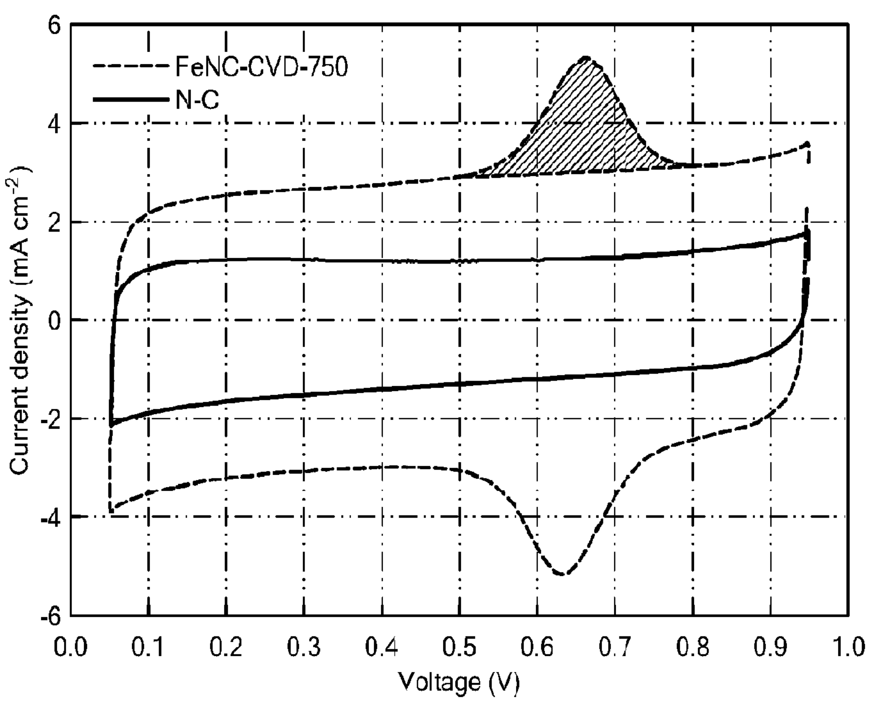
FIG. 7A shows cyclic voltammograms (CVs) of FeNC-CVD-750 and N—C zeolitic imidazolate framework collected in Ar-saturated 0.5 M $H_2SO_4$ electrolyte at room temperature with a scan rate of 10 mV·s−1.

The synthesized FeNC-CVD-750 catalysts can show unprecedented ORR activity in a $H_2$—$O_2$ PEMFC. The catalysts have ultra-dense Fe—$N_4$ sites as reflected by the high intensity of the $Fe^{3+/2+}$ redox peaks (FIG. 7A). The Fe wt % of the catalysts was estimated by inductively coupled plasma and is about 2 wt % (Table 2), which can be more than catalysts produced by conventional methods, particularly when the Fe at an exterior surface of the catalyst is considered. The surface deposition feature of the methods disclosed herein forms enriched Fe—$N_4$ sites on the surface and thus improves the PEMFC performance.

Figure 7B:
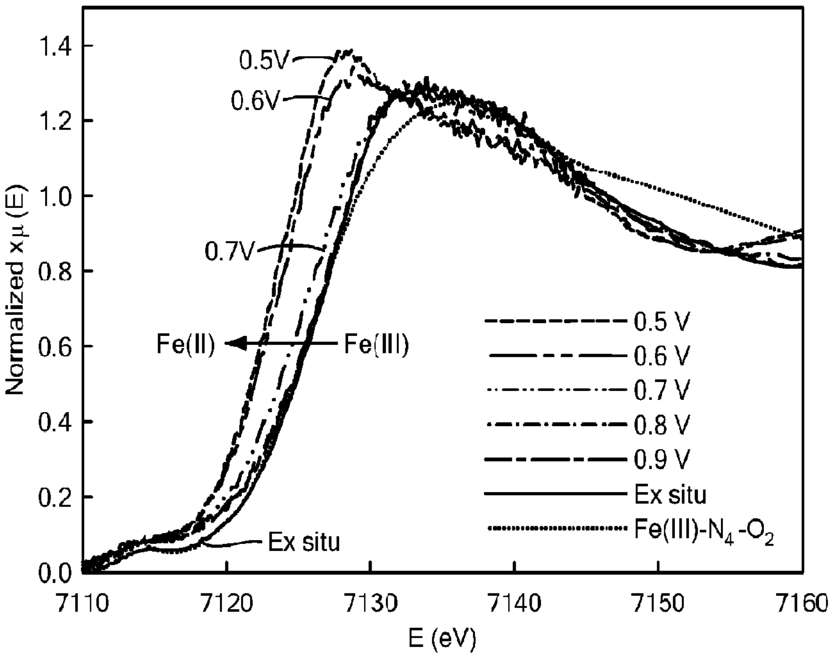
FIG. 7B shows in situ XANES of FeNC-CVD-750 collected in $O_2$-purged 0.5 M $H_2SO_4$ at room temperature as a function of potential during the anodic-going scan.
Figures 7C, 7D:
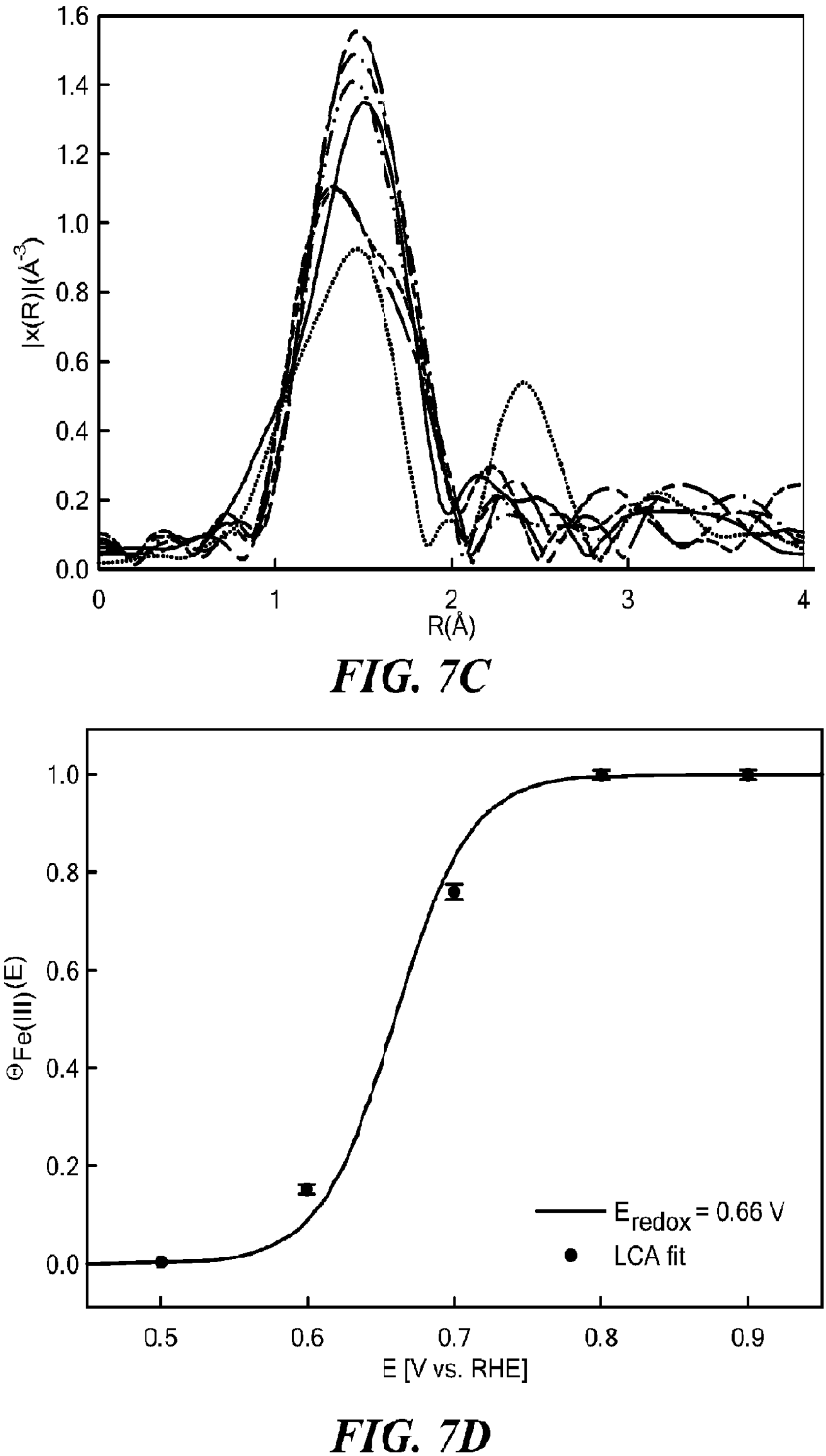
FIG. 7C shows in situ FT-EXAFS of FeNC-CVD-750 collected in $O_2$-purged 0.5 M $H_2SO_4$ at room temperature as a function of potential during the anodic-going scan.
FIG. 7D shows a comparison of the fraction of Fe(III) over the total amounts of Fe [ΘFe(III)] as a function of potential derived from the linear combination analysis (LCA) of the XANES spectra (circles) and from Equation 3 with a redox potential (Eredox) of 0.66 V.

To confirm that all the Fe—$N_4$ sites in FeNC-CVD-750 are electrochemically active during the ORR, in situ XAS was conducted on FeNC-CVD-750 at the Fe K-edge in an $O_2$-purged 0.5 M $H_2SO_4$ electrolyte in a flow cell as a function of applied potential. The XANES and FT-EXAFS spectra collected at 0.9 V nearly overlap that of Fe(III)Pc-$O_2$ (FIG. 7B), which confirms that the vast majority of Fe—$N_4$ sites are in the form of Fe(III)—$N_4$—$O_2$ at 0.9 V (see Table 4). As the potential is gradually reduced to 0.5 V, the XANES spectrum shifts negatively, and correspondingly the intensity of the FT-EXAFS peak drops (FIG. 7C). These occurrences have been commonly observed on Fe—N—C catalysts and ascribed to the redox transition from Fe(III)—$N_4$—$O_2$ to Fe(II)—$N_4$ (Zitolo, A, et al., 2017, Li, J, et al., 2016, Osmieri, L, et al., 2019, Li, J, et al., 2017). However, the FT-EXAFS spectrum at 0.5 V exhibits a shoulder around 1.8 Å, rather than just the one prominent peak observed at 0.9 V (FIG. 7C), and it cannot be fitted with an Fe—$N_4$ model. As depicted in FIG. 7D, the ΘFe(III)(E) acquired by the linear combination analysis (LCA) closely follows the one calculated from Equation 3, which is described below.

Some leading PGM-free ORR catalysts are transition metal-nitrogen-carbon (Me-N—C, e.g., M=Fe or Co) materials (Li, J, et al., 2018; Zitolo, A, et al., 2017; Zhang, H, et al., 2017). Highly active Fe—N—C catalysts have been produced by various methods such as hard templating (silica) (Serov, A, et al., 2015; Wan, X, et al., 2019) and soft templating (polymer and organic compounds) (Chung, H T, et al. 2017; Tylus, U, et al., 2014), of Zn-based metal organic framework (Zhang, H, et al., 2019). All these methods incorporate the core feature of the synthesis route initiated by Gupta, S and Yeager, et al., in 1989, that is, pyrolyzing at 900-1100° C. a catalyst precursor that includes mixed Fe, N, and C elements.

From structural characterizations, it has been identified that all the pyrolyzed Fe—N—C catalysts share similar Fe—$N_4$ sites (Li, J, et al., 2016), formed during the pyrolysis step (Li, J, et al., 2020). The ORR activity in acid medium of these Fe—N—C catalysts is limited by both the low turnover frequency (TOF) and low density of gas-phase accessible Fe—$N_4$ sites per mass of Fe—N—C($SD_{mass}$) (Primbs, M, et al., 2020). Primbs et al. (2020) reported a comprehensive analysis of the catalytic oxygen reduction reaction (ORR) reactivity of four benchmark platinum group metal-free (PGM-free) iron/nitrogen doped carbon electrocatalysts. Primbs et al. determined the $SD_{mass}$ via CO chemisorption and the ensuing average TOF. Among this set of benchmark catalysts, both the highest $SD_{mass}$ (~$6\times10^{19}$ sites·$g^{-1}$) and highest TOF (~0.7 $e^-$·$site^{-1}$·$s^{-1}$ at 0.8 V) are approximately one order of magnitude lower than that of Pt/C (Paulus, U A, et al., 2002, Gasteiger, H A, et al., 2005). Thus, improving the TOF and/or $SD_{mass}$ of Fe—N—C catalysts can be effective pathways to advancing their ORR activity. It is unclear how to improve the TOF of Fe—$N_4$ sites prepared via pyrolysis. Developing other PGM-free sites with higher TOFs may be an alternative option. Recently, a Sn—N—C catalyst with Sn—$N_x$ sites showed a similar TOF than Fe—$N_4$ sites in a parent Fe—N—C catalyst prepared similarly, but a lower $SD_{mass}$ (Luo, F, et al., 2020).

Increasing the $SD_{mass}$ of Me-N—C catalysts can be the most feasible approach to increase their ORR activity. It faces however at least two challenges: i) the parallel formation during pyrolysis of Fe—$N_4$ sites and ORR-inactive or less active Fe species at high Fe content (Proietti, E, et al., 2011, Zhang, H, et al., 2019), and ii) the uncontrolled location of Fe—$N_4$ sites, a fraction of them being buried in the bulk of the N-doped carbon matrix with current synthetic approaches, and therefore inaccessible by $O_2$.

Related to the challenges i) and ii), herein are defined two utilization sub-factors, $U_{Fe}$, and $U_{FeN4}$, the former being the ratio of the number of Fe atoms present as Fe—N4 moieties to the total number of Fe atoms in a Fe—NC catalyst, and the latter the ratio of gas-phase accessible Fe—$N_4$ moieties to all Fe—$N_4$ moieties in a catalyst. The $SD_{mass}$ can be related to $U_{Fe}$, $U_{FeN4}$, and the Fe wt % by Equation 1.

$$SD_{mass} = \frac{\text{Fe } wt\ \%}{100 \times M_{Fe}} \times N_A \times U_{Fe} \times U_{FeN4} \quad \text{Equation 1}$$

Where Fe wt % is the total Fe content in Fe—N—C, $M_{Fe}$ is the molar mass of iron. $N_A$ IS Avogadro's constant. The overall utilization factor, U, can be defined by Equation 2.

$$U=U_{Fe}\times U_{FeN4} \quad \text{Equation 2}$$

Developing a synthetic approach that favors the conversion of Fe into Fe—$N_4$ sites even at relatively high Fe content, while simultaneously favoring the location of Fe—$N_4$ sites on the outer-surface, is a long sought technology.

As an example of the challenge i), Wan, X and Shui et al. (Wan, X, et al., 2019) recently showed that the U of their Fe—N—C catalysts dramatically drops from 43.5% to ~11.4% as the Fe content increases from 0.3 wt % to 2.8 wt %, due to strong Fe clustering at high Fe content. This led to a maximum $SD_{mass}$ of $3.4\times10^{19}$ sites·$g^1$, comparable to those of the benchmark Fe—N—C catalysts discussed in Primbs et al., 2020.

As an example of the challenge ii), Primbs et al. (2020) showed that the $SD_{mass}$ values measured by CO-chemisorption of Fe—N—C catalysts with Fe being present only or mostly as Fe—$N_4$ sites are significantly lower than the total number of Fe—$N_4$ sites determined by $^{57}$Fe Mössbauer spectroscopy. The $SD_{mass}$ values reached only 20-45% of the bulk SD of Fe—$N_4$ sites (i.e. $U_{FeN4}$=20-45%), except for the PAJ or Pajarito Powder Inc. (pajaritopowder.com) catalyst ($U_{FeN4}$ 80%). The latter, however, was characterized at the same time with a low $U_{Fe}$ value, with Fe being present mainly as Fe particles (Primbs, et al., 2020). The low $U_{Fe}$ and/or $U_{FeN4}$ in Fe—N—C catalysts are related to the major approach for the synthesis of Fe—N—C catalysts that involves mixing or combining Fe, N, and C precursors first, and subjecting the catalyst precursor to high-temperature pyrolysis leading to the simultaneous transformation of N and C into a N-doped carbon matrix and of Fe, N and C into Fe—$N_4$ sites and/or Fe clusters. This results in the formed Fe—$N_4$ sites being located rather uniformly mixed throughout the N-doped microporous carbon (N—C) matrix. Those Fe—$N_4$ sites buried in the core are electrochemically inactive, leading to $U_{FeN4}$<<100%.

High Fe contents can also reduce the $U_{Fe}$ by graphitizing the N—C zeolitic imidazolate framework during pyrolysis, lowering the N-content, in turn decreasing the ability of N—C zeolitic imidazolate framework to accommodate Fe—$N_4$ sites (Proietti, E, et al., 2011). The $SD_{mass}$ of Fe—N—C catalysts is inherently limited when using the existing synthesis approaches including mixing of materials before pyrolysis. Increasing the $SD_{mass}$ of Fe—N—C catalysts by developing new synthesis routes is, however, hindered by the poor understanding of the Fe—N4 site formation mechanism during pyrolysis.

During investigations herein, it has been determined that Fe—$N_4$ sites can be formed through gas phase diffusion of single iron atoms ($Fe_1$) in tetrahedral Fe-04 moieties into $N_4$—C cavities during pyrolysis (Li, J, et al., 2020). The ultrashort diffusion length of Fe, requires close proximity of Fe sources and $N_4$—C cavities, otherwise Fe, atoms nucleate forming Fe clusters during diffusion, as observed during the pyrolysis of Fe(II) acetate that is not in physical contact with the N—C zeolitic imidazolate framework substrate (Li, J, et al., 2020). This research explains the necessity to sufficiently mix Fe precursor with N and C precursors to form Fe—$N_4$ sites with previous synthesis routes. The technology herein avoids the mixing stage and minimizes the formation of Fe clusters by choosing Fe precursors with long diffusion lengths.

The technology herein can implement chemical vapor deposition (CVD) to flow iron chloride vapor above a bed of N—C zeolitic imidazolate framework powders to preferentially form Fe—$N_4$ sites on the outer-surface. The iron chloride vapor can have a long diffusion length because the Fe atoms are individually surrounded by chloride ions, which prohibits iron atoms from nucleating during diffusion. Structural and electrochemical characterization confirm that a high density of Fe—$N_4$ sites are exclusively formed on the outer-surface of N—C zeolitic imidazolate framework, accessible by air, leading to full utilization of Fe—$N_4$ sites ($U_{FeN4}$=100%). A catalyst synthesized herein at 750° C. exhibits an unprecedented ORR activity of 33 mA·cm$^{-2}$ at 0.90 $V_{iR\text{-}free}$ and 44 mA·cm$^{-2}$ at 0.89 $V_{iR\text{-}free}$ in an $H_2$—$O_2$ PEMFC at 1.0 bar and 80° C., only 0.01 V lower than the DOE 2025 target (FIG. 4).

An Fe—N—C catalyst, which can be prepared by flowing iron chloride vapor above a N—C zeolitic imidazolate framework substrate at about 750° C., has a record Fe—$N_4$ site density of $2\times10^{20}$ sites·gram$^{-1}$ with 100% site utilization. A combination of characterizations shows that the Fe—$N_4$ sites formed via CVD are located exclusively on the outer-surface, are accessible by air, and are electrochemically active.

EXAMPLES

Zinc nitrate hexahydrate ($Zn(NO_3)_2$.$6H_2O$, 99.0%), 2-methylimidazole (99%), methanol solution, zinc phthalocyanine (Zn(II)Pc, 97%), 1,10-phenanthroline monohydrate, ethanol solution, anhydrous Iron(III) chloride ($FeCl_3$, 99%), iron(II) phthalocyanine (Fe(II)Pc, 95%), Iron(III) phthalocyanine-tetrasulfonic acid (Fe(III)Pc-$O_2$, 80%), and sulfuric acid ($H_2SO_4$, 95-97%, PPT Grade) were purchased from Sigma-Aldrich. All aqueous solutions were prepared using deionized (DI) water (18.2 MO/cm) obtained from an ultrapure purification system.

Example 1: Synthesis of Zeolitic Imidazolate Framework

To obtain a highly porous and nitrogen rich substrate, a zeolitic imidazolate framework (ZIF-8) was prepared. 200 mL homogeneous 0.1 M $Zn(NO_3)_2$.$6H_2O$ methanol solution was added to 200 mL 0.4 M 2-methylimidazole methanol solution under magnetic stirring for one hour at room temperature. The suspension was collected and washed by centrifugation using methanol three times. The washed suspension was then dried at 40° C. in a vacuum oven overnight. The crystal size of the ZIF-8 was a uniform ~80 nm. FIG. 2A shows a transmission electron microscope image of the ZIF-8, with a scale bar at lower right of 100 nm.

Figures 9, 10:
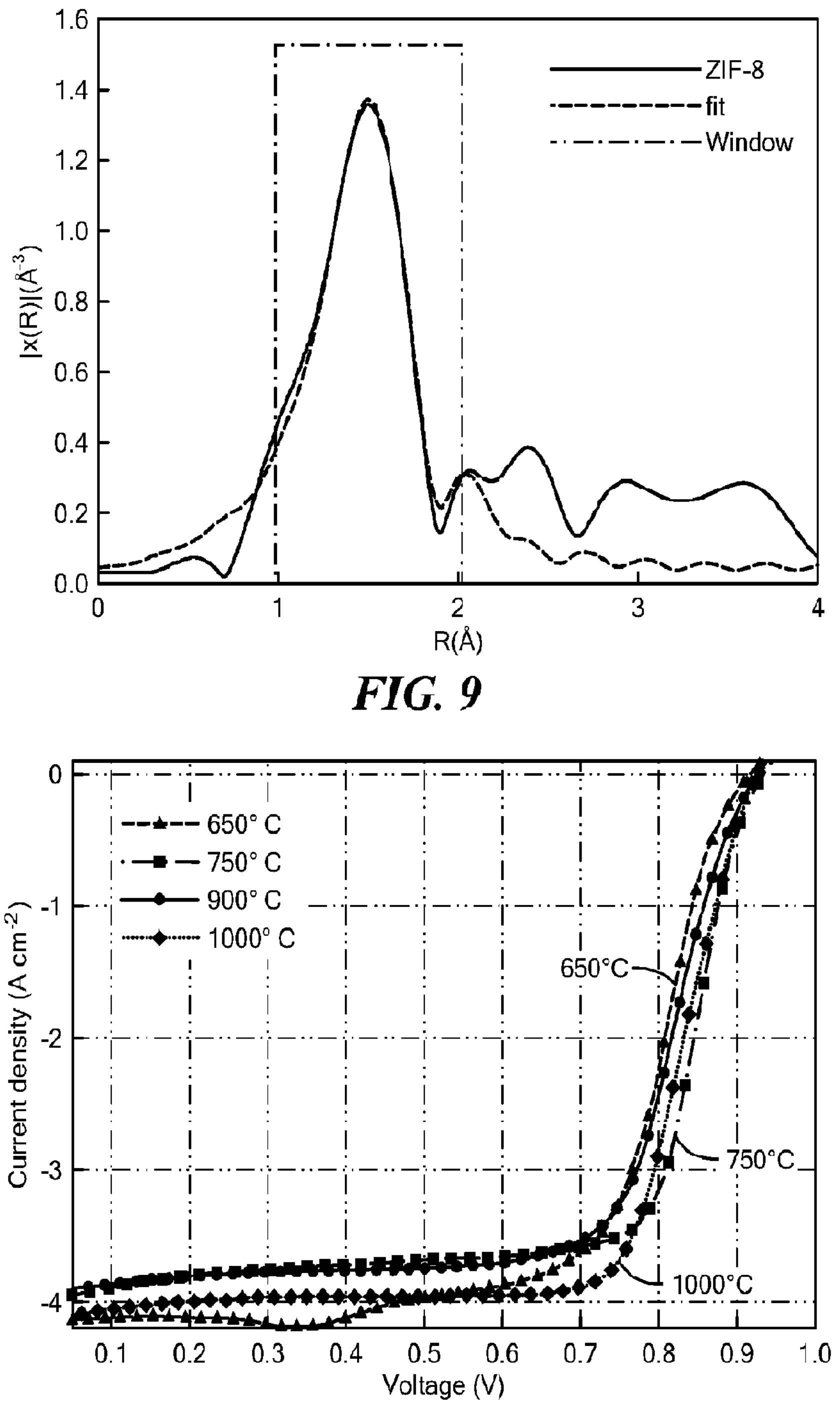
FIG. 9 shows an FT-EXAFS spectrum of a synthesized zeolitic imidazolate framework at the Zn K-edge with the corresponding fit. Fitting results are listed in Table 1.
FIG. 10 shows a steady-state RDE polarization in $O_2$-saturated 0.5 M $H_2SO_4$ at room temperature using a rotation rate of 900 rpm, 20 mV potential steps from 0.05 to 0.95 V, and a 25 s potential hold time at each step for FeNC-CVD-650, FeNC-CVD-750, FeNC-CVD-900, and FeNC-CVD-1000.

The X-ray diffraction (XRD) pattern of the synthesized ZIF-8 matches that of the pattern in the XRD database (JCPDS: 00-062-1030), verifying the exclusive formation of ZIF-8. FIG. 2B shows the XRD pattern of the synthesized ZIF-8 in the top trace. In FIG. 2B, the bottom trace is labeled as the simulated ZIF-8 XRD pattern from JCPDS: 00-062-1030. The tetrahedral Zn—$N_4$ structure in the ZIF-8 was confirmed by analysis of the Fourier-transform of the extended X-ray absorption fine structure (FT-EXAFS) spectrum at the Zn K-edge, which is shown in FIG. 9. Table 1 presents a summary of the fitting results illustrated in FIG. 9.

Next, the nanosized ZIF-8 (1.0 g) and 0.25 g 1,10 phenanthroline were dispersed in a solution of ethanol and deionized water with a volume ratio of 2:1. The mixture was magnetically stirred for two hours and then dried at 80° C. in a vacuum oven overnight. The dry powder was ball milled for 3 hours in a plastic container with 5 plastic balls with a diameter of 0.25 inch (0.635 cm). The collected powders were then pyrolyzed under Ar at 1050° C. for one hour, after reaching the 1050° C., with a ramping rate of 5° C. per minute, followed by cooling down naturally to room temperature. The powders obtained were labelled as "N—C" zeolitic imidazolate framework.

FIG. 2C shows fitting of the Zn K-edge EXAFS data for the N—C zeolitic imidazolate framework. Table 1 presents the Zn—N bond distance shown as R(A). As shown in FIG. 2C and in Table 1, fitting of the Zn K-edge EXAFS data for the N—C zeolitic imidazolate framework shows that Zn is present in the form of Zn—$N_4$ with a Zn—N bond distance of 2.00±0.01 Å. A similar Zn—$N_4$ structure was recently reported by Jaouen et al (Li, J; Pršlja, P, et al., 2019) in a nitrogen-doped carbon prepared by flash pyrolysis of ZIF-8 at 1050° C., with or without mixing with a second transition metal.

The existence of the Zn—N binding is also supported by fitting of the X-ray photoelectron spectroscopy (XPS) Nis spectrum shown in FIG. 2D, wherein the shaded peak at ~399.5 eV is commonly assigned to N bonded to a transition metal (Artyushkova, 2020).

The N—C zeolitic imidazolate framework was shown to have a Brunauer-Emmett-Teller area of 807 m$^2$·g$^{-1}$ and a microporous surface area of 692 m$^2$·g$^{-1}$. The high porosity of the N—C zeolitic imidazolate framework is a result of the high initial microporosity of the ZIF-8, plus the release of a large amount of Zn from ZIF-8 as Zn vapor during the pyrolysis creates abundant voids inside the ZIF-8 crystals. This is supported by the scanning electron microscopy (SEM) images that manifest the preservation of the size and shape of the crystals of ZIF-8 (FIG. 2A) after pyrolysis and transformation into N—C zeolitic imidazolate framework particles, despite the significant loss of the mass (FIG. 2E and FIG. 2F). FIG. 2E shows an SEM image of the N—C zeolitic imidazolate framework with a scale bar of 1 micron at lower right. FIG. 2F shows and SEM image of the N—C zeolitic imidazolate framework with a scale bar of 300 nm at lower right. shown. Single Zn atoms embedded in the highly porous N—C zeolitic imidazolate framework can be directly visualized using aberration-corrected scanning transmission electron microscopy (AC-STEM) in annular dark-field (ADF) images (FIGS. 2G-2K). In FIG. 2K, which has a scale bar of 2 nm, residual Zn atoms are circled. Collectively, the N—C zeolitic imidazolate framework possesses abundant Zn—$N_4$ moieties embedded in a highly porous carbon matrix.

TABLE 1

Summary of the fitting results of the FT-EXAFS spectra collected at the Zn Kedge of the prepared ZIF-8, commercial Zn(II)Pc, and the Zn in the ZIF-8-derived N—C.

| Zn—N bond | R(Å) | N | $\sigma^2 \times 10^{-3}$(Å$^2$) | $E_0$ (eV) |
|---|---|---|---|---|
| ZIF-8 | 1.99(1) | 4.1(5) | 6(2) | 4(1) |
| Zn(II)Pc | 1.98(1) | 3.8(8) | 4(2) | 5(2) |
| N—C | 2.00(1) | 4.8(5) | 12(2) | 3(1) |

In Table 1, fits were done at the Zn K-edge in R-space, $k^{1,2,3}$ weighting. 1.0<R<2.0 Å and Δk=2.275-10.61 Å$^{-1}$. $S_0^2$ was fixed at 0.95 obtained by fitting the reference Zn foil. The number given in the parentheses represents the uncertainty of the last digit of the fitting result.

The synthesized N—C zeolitic imidazolate framework contains 4.23 wt % of N and 2.16 wt % of Zn, as determined by inductively coupled plasma optical emission spectrometry (ICP-OES) results shown in the "N—C" entry of Table 2.

TABLE 2

Element contents in the N—C and FeNC—CVD-T determined by ICP-OES.

| wt % | Fe | Zn | N | C |
|---|---|---|---|---|
| N—C | — | 2.16 | 4.23 | 84.00 |
| FeNC—CVD-650 | 2.25 | 1.05 | 3.97 | 85.42 |
| FeNC—CVD-750 | 2.00 | 0.12 | 4.24 | 85.48 |
| FeNC—CVD-900 | 3.76 | 0.23 | 3.32 | 85.42 |
| FeNC—CVD-1000 | 2.72 | 0.03 | 2.36 | 84.20 |

Example 2. Functional Characterization of the Catalyst

The catalyst produced according to Example 1 was characterized. As shown in FIG. 1, the ORR (oxidization reduction reaction) performance of the catalyst was high compared to catalysts made by conventional methods. The highest reported ORR activity of Fe—N—C catalysts pyrolyzed by mixing the Fe, N, and C precursors together is ~22 mA·cm$^{-2}$ at 0.90 V iR-free in $H_2$—$O_2$ PEMFCs. In contrast, the Fe—N—C catalyst disclosed herein delivers a current density of 33 mA·cm$^{-2}$ at 0.90 V iR-free in $H_2$—$O_2$ PEMFCs under the same conditions. The steady-state RDE polarization plot in FIG. 1 was obtained by using a 20 mV potential step and 25 s potential hold time at every step in $O_2$-saturated 0.5 M $H_2SO_4$ from 0.05 to 0.95 V with a rotation rate of 900 rpm at room-temperature.

In FIG. 2, the cyclic voltammogram (CV) of the same catalyst was acquired after the ORR polarization curve (presented in FIG. 1) in the same electrolyte with a scan rate of 10 mV·s$^{-1}$ at room-temperature.

The $H_2$—$O_2$ PEMFC polarization curves with and without iR-correction are shown in FIG. 3 and were measured with the cathode having approximately 6.0 mg·cm$^{-2}$ of the catalyst and an anode having about 0.3 $mg_{Pt}$·cm$^{-2}$ Pt/C. The membrane was Nafion 212, and 200·mL/min$^{-1}$ gas was fed at both anode ($H_2$) and cathode ($O_2$) with 100% RH, and 1.0 bar partial pressure each side. The cell was at 80° C., and the electrode area was 5 cm$^2$. In FIG. 4, the Tafel plot derived from the iR-corrected ORR polarization curve displayed in FIG. 3 is shown to manifest the activity at 0.9 V in comparison with the DOE 2025 target (the DOE 2025 target is 44 mA·cm$^{-2}$ at 0.90 V).

For example, anhydrous $FeCl_3$ (99%, Sigma-Aldrich) was chosen as an Fe source because of its low boiling point, ~316° C. The low boiling point can allow for generation of iron chloride vapor at low temperature (Kanari, N, et al., 2010; Rustad, D S, and Gregory, N W, 1983). A furnace tube was configured to contain a flow of an inert gas. 80 mg of anhydrous $FeCl_3$ was placed in a boat in the tube at the upstream of the gas flow. 80 mg of the N—C zeolitic imidazolate framework was placed in another boat in the form of a thin layer downstream of the $FeCl_3$. There was a 1 cm gap between the two boats with one end cutting off. The furnace was heated up to a variety of temperatures with a ramping rate of 25° C. per minute, and then the temperature was held at a target temperature (T) for three hours, followed by cooling down to room temperature naturally. The furnace was continuously flowed with Ar gas with a flow rate of 0.65 L·min$^{-1}$ during the heating and cooling. The powders were then collected from the N—C zeolitic imidazolate framework boat. The collected powders were then subjected to magnetic purification by slowly moving a small magnet ~0.5 cm above to remove Fe nanoparticles. The purified powders were labelled FeNC-CVD-T, where T represents the pyrolysis temperature in ° C. For example, Table 2 shows the elemental content for FeNC-CVD-650, FeNC-CVD-750, FeNC-CVD-900, and FeNC-CVD-1000. The catalyst powders were stored in a vacuum desiccator before being subjected to RDE and PEMFC evaluations.

Example 3: Evaluation of the ORR Activity and Performance of the FeNC-CVD-750

To prepare the catalyst powders for electrochemical characterization-rotating disk electrode (RDE), the catalyst powders were deposited on a glassy carbon working electrode. Catalyst inks were prepared by dispersing 10 mg of the catalyst powder in a mixture of Millipore water (36.5 μL, 18.2 MΩ cm) and ethanol (300 μL, Sigma-Aldrich, 99.8%), into which 5 wt % Nafion solution (108.5 μL, Sigma-Aldrich) was added as a binder phase. The resulting mixture was sonicated for 60 minutes in an ice bath, and then an aliquot of 8.8 μL was drop-cast onto the glassy carbon electrode (0.247 cm$^2$, Pine instrument), resulting in a loading of 800 μg·cm$^{-2}$. The working electrode with the deposited catalyst layer was used in a three-electrode cell set-up connected to a bipotentiostat (Biologic SP 300) and rotator (Pine Instruments). A graphite rod and reversible hydrogen electrode (RHE) were used as counter and reference electrodes, respectively. The ORR performance was evaluated via steady-state RDE polarization in $O_2$-saturated 0.5 M $H_2SO_4$ using a rotation rate of 900 rpm, 20-mV potential steps from 0.05 to 0.95 V, and a 25-s potential hold time at each step at room temperature. The cyclic voltammetry (CV) was carried out between 0.05 to 0.95 V vs. RHE with a scan rate of 10 mV·s$^{-1}$ in Ar-saturated 0.5 M $H_2SO_4$ electrolyte. On the other hand, the ORR performance of Pt/C was evaluated in $O_2$-saturated 0.1 M $HClO_4$ using a rotation rate of 900 rpm and a scan rate of 10 mV·s$^{-1}$ at room temperature. The ORR polarization curve was corrected by the CV obtained by scanning the electrode between 0.05 to 0.95 V vs. RHE with a scan rate of 10 mV·s$^{-1}$ in Ar-saturated 0.1 M $HClO_4$. The hydrogen underpotential (HUPO) charge was determined by integrating the $H_{UPD}$ peaks in the potential range of 0.05-0.45 V.

The ORR activities of FeNC-CVD-650, FeNC-CVD-750, FeNC-CVD-900, and FeNC-CVD-1000 were measured using the rotating disk electrode (RDE). Among the four catalysts, FeNC-CVD-750 exhibited the highest ORR activity (FIG. 10) with a half wave potential of 0.85 V (all potentials are versus reversible hydrogen electrode) when using a catalyst loading of 800 $\mu g \cdot cm^{-2}$ and oxygen-saturated 0.5 M $H_2SO_4$ (FIG. 5A). FIG. 5A shows the ORR polarization curve of the FeNC-CVD-750 catalyst (lower curve) compared to the ORR polarization curve of the N—C zeolitic imidazolate framework (N—C, upper curve). Measurement is steady-state RDE polarization curve in room-temperature, $O_2$-saturated 0.5 M $H_2SO_4$ using a rotation rate of 900 rpm, 20 mV potential steps from 0.05 to 0.95 V, and a 25 seconds potential hold time at each step. The corresponding kinetic current density derived from the current at 0.8 V and the limiting current using the Koutecky-Levich equation is 20 $mA \cdot cm^{-2}$ or 25 $A \cdot g^{-1}$ (FIG. 5B). These half-wave potential and mass activity values are among the highest reported for PGM-free catalysts in acidic electrolyte (Beltren, D E, and Litster, S, 2019). The kinetic current density exhibits a Tafel slope of ~60 mV/dec above 0.8 V (FIG. 5B), which has been commonly reported for Fe—N—C catalysts (Osmieri, L, et al. 2019; Li, J, et al., 2017). This Tafel slope is comparable to that of Pt-based catalysts (Gasteiger, H A, et al., 2005), indicating that they share the same rate determining step for the ORR.

An electrochemical characterization-fuel cell was prepared. The FeNC-CVD-750 catalyst was used to prepare the cathode for MEA tests in a PEMFC under $H_2$—$O_2$ and $H_2$-air conditions. The cathode catalyst inks were prepared by dispersing calculated amount of catalyst powder and Nafion D521 dispersion (Ion power) into 50 wt/% 1-propanol aqueous solution for 3 hours under ice bath sonication. The inks were coated layer by layer on SGL 29-BC gas diffusion layer (Sigracet) until 6 $mg \cdot cm^{-2}$ loading was achieved. A commercial Pt gas diffusion electrode (0.3 $mg_{Pt}cm^{-2}$, fuel cell store) was used as the anode. The anode electrode was first hot pressed onto NR212 membrane (Ion Power) at 130° C. for 4 minutes. Before hot pressing the cathode on the opposite side of the membrane, a thin Nafion overspray layer was applied on the cathode catalyst layer to reduce the interfacial resistance. The cathode was then hot pressed on the previously-pressed half MEA at 130° C. for 2 minutes. The MEA was then assembled into a single cell with single-serpentine flow channels. The single cell was then evaluated in a fuel cell test station (100 W, Scribner 850e, Scribner Associates). The cells were conditioned under $N_2$ environment, at 100% relative humidity and 80° C. for at 2 hours. Oxygen flowing at 1000 $mL \cdot min^{-1}$ and $H_2$ (purity 99.999%) flowing at 200 $mL \cdot min^{-1}$ were used as the cathode and anode reactants, respectively. The back pressures during the fuel cell tests are 1.0 bar reactant gas. The vapor pressure is around 0.5 bar owing to the 100% relative humidity. Thus, the total pressure applied to the MEA is around 1.5 bar (150 KPa). Fuel cell polarization curves were recorded in a voltage control mode.

The $H_2$-air performance of FeNC-CVD-750 was evaluated in a differential cell owing to its superior mass transport of air. The protocol is otherwise largely the same as that applied for the $H_2$—$O_2$ PEMFC evaluation. Few differences include (1) the cathode FeNC-CVD-750 catalyst loading was 4 $mg \cdot cm^{-2}$; (2) the anode loading was 0.2 $mg_{Pt}cm^{-2}$; and (3) air flowing at 1000 $mL \cdot min^{-1}$ and $H_2$ (purity 99.999%) flowing at 200 $mL \cdot min^{-1}$ were used as the cathode and anode reactants, respectively.

The FeNC-CVD-750-containing electrode was evaluated in an $H_2$—$O_2$ PEMFC for three full polarization scans, followed by acquisition of $H_2$-air polarization curves on the same membrane electrode assembly (MEA). A current density of 44 $mA \cdot cm^{-2}$ is reached at 0.89 $V_{iR\text{-}free}$ during the first scan (increasing-current) in the $H_2$—$O_2$ PEMFC at 1.0 bar partial pressure of $O_2$ and 80° C., 0.01 V lower than the DOE 2025 target (FIG. 3 and FIG. 4). In FIG. 3, the Cathode includes: ~6.0 $mg \cdot cm^{-2}$ of the FeNC-CVD-750 catalyst; the anode: 0.3 $mg_{Pt}cm^{-2}$ Pt/C; membrane: Nafion 212; 200 $mL \cdot min^{-1}$ gas fed at the anode ($H_2$) and 1000 $mL \cdot min^{-1}$ at the cathode ($O_2$) at 100% RH, 1.0 bar partial pressure $H_2$ and $O_2$, 80° C., electrode area 5 $cm^2$. A current density of 33 $mA \cdot cm^{-2}$ was achieved at 0.9 $V_{iR\text{-}free}$ and 380 $mA \cdot cm^{-2}$ at 0.8 $V_{iR\text{-}free}$, both exceeding those of all previous PGM-free catalysts reported to date in $H_2$—$O_2$ PEMFCs under similar conditions (FIG. 5C).

The current at 0.9 $V_{iR\text{-}free}$ drops to 22 $mA \cdot cm^{-2}$ and then 18 $mA \cdot cm^{-2}$ on the second and third scans, respectively (FIG. 11A and FIG. 11B) indicating that the FeNC-CVD-750 catalyst has poor stability in $H_2$—$O_2$ PEMFCs, similar to all highly active Fe—N—C catalysts (Shao, Y, et al., 2019; Osmieri, L, et al., 2020). This result is expected since all these Fe—N—C catalysts, including FeNC-CVD-750, likely share the same Fe—$N_4$ active sites. Despite the degradation, a maximum power density of 0.37 $W \cdot cm^{-2}$ was obtained in the subsequent $H_2$-air PEMFC testing (FIG. 5D), which is among the highest values reported for PGM-free catalysts thus far. The conditions for FIGS. 11A and 11B were cathode: ~6.0 $mg \cdot cm^{-2}$ of the FeNC-CVD-750 catalyst; anode: 0.3 $mg_{Pt}cm^{-2}$ Pt/C; Membrane: Nafion 212; 200·$mL/min^{-1}$ gas fed at both anode ($H_2$) and cathode ($O_2$) with 100% RH, and 1.0 bar partial pressure each side; cell 80° C.; electrode area 5 $cm^2$.

Example 4: Characterization of the FeNC-CVD-750

Figure 12B:
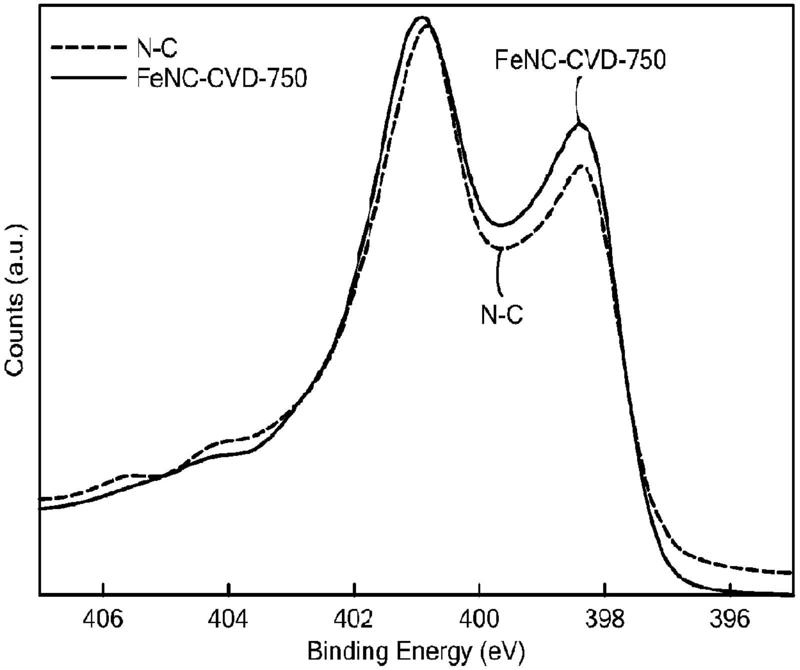
FIG. 12B shows XPS Nis spectra of N—C zeolitic imidazolate framework (lighter grey trace) and FeNC-CVD-750 (darker black trace).

To understand the source of its exceptional ORR activity, the FeNC-CVD-750 was characterized using multiple techniques. A representative SEM image of FeNC-CVD-750 (FIG. 6A) shows a similar powder morphology to the N—C zeolitic imidazolate framework (FIG. 2F), without noticeable particle growth and aggregation. Meanwhile, the ADF- and secondary electron (SE)-STEM images, at different magnifications, show the highly porous morphology of the carbon matrix and absence of metal clusters (FIG. 6B-6D). Moreover, the XRD pattern (FIG. 12A), the C and N contents (Table 2), and the XPS Nis spectrum (FIG. 6E and FIG. 12B) of FeNC-CVD-750 are nearly the same as those of the N—C zeolitic imidazolate framework. These results show that the overall morphology of the N—C zeolitic imidazolate framework is largely preserved after the CVD at 750° C., which is expected considering that the N—C zeolitic imidazolate framework was synthesized using pyrolysis at 1050° C. prior to the CVD of Fe. On the other hand, the Zn content drops from 2.16 wt % in the N—C zeolitic imidazolate framework to 0.12 wt % in FeNC-CVD-750, accompanied by incorporation of 2.00 wt % Fe (see Table 2). The presence of abundant Fe—$N_x$ moieties in FeNC-CVD-750 is directly evidenced by atomic resolution ADF-STEM imaging coupled with electron energy loss spectroscopy (EELS). Abundant bright dots are clearly seen in the ADF-STEM image (FIG. 6G, inset), for which the EELS point spectrum shows the close proximity of single Fe atom and N (FIG. 6G, FIG. 13A, and FIG. 13B).

The presence of Fe—$N_4$ moieties in FeNC-CVD-750 is also supported by the $^{57}$Fe Mössbauer spectrum collected at 5 Kelvin (FIG. 6H). The lowest possible temperature during Mössbauer data acquisition is important to distinguish superparamagnetic Fe species (such as nano-Fe-oxides) from Fe—$N_4$ sites. While both nano-Fe-oxides and $O_2$—Fe (III)—$N_4$ sites lead to a similar D1 signal at room temperature, this degeneracy is usually unveiled at 5 K: nanosized superparamagnetic Fe oxides convert into a sextet component while $O_2$—Fe(III)—$N_4$ sites still contribute with a D1 component (Li, J, Jia, Q, et al., 2019).

The $^{57}$Fe Mössbauer spectrum at 5K of FeNC-CVD-750 identifies two doublets, labelled D1 and D3, representing 89% and 11% of the absorption area, respectively (FIG. 6H and Table 3).

TABLE 3

Parameters obtained from fitting the Mössbauer spectrum of FeNC—CVD-750 acquired at 5K (FIG. 6H): relative area (RA, %), isomer shift (IS, mm $s^{-1}$), quadrupole splitting (QS, mm $s^{-1}$), and line width (LW, mm $s^{-1}$) of each component.

| Comp. | RA % | IS mm $s^{-1}$ | QS mm $s^{-1}$ | LW mm s−1 | Assignment |
|---|---|---|---|---|---|
| Doublet 1 | 89 | 0.50 | 1.02 | 1.25 | $O^2$—Fe(III)—$N_4$ |
| Doublet 3 | 11 | 0.97 | 3.56 | 0.92 | $FeCl_2$•x$H_2O$ |

D1 has been commonly observed for Fe—N—C materials and has recently been assigned to $O_2$—Fe(III)—$N_4$ (Li, J, Ghoshal, S, et al., 2016; Li, J, Jiao, L, et al., 2020; Mineva, T, et al., 2019). D3 can be unambiguously assigned to a high spin $Fe^{2+}$ species, due to its high IS of 0.97 mm/s. A doublet with similar isomer shift (IS) and quadrupole slitting (QS) than those of D3 here were previously observed in the Fe—N—C catalysts synthesized via low temperature imprinting iron chlorides into N-doped carbon matrix at both room temperature and 4.2 K (Menga, D. et al. Active-Site Imprinting: Preparation of Fe—N—C Catalysts from Zinc Ion-Templated Ionothermal Nitrogen-Doped Carbons. Advanced Energy Materials 9, 1902412 (2019)). Meanwhile, the Mössbauer spectrum of the powdered $FeCl_2 \cdot 4H_2O$ crystal collected at 4.2 K exhibits a QS (3.13 mm/s) close to that of the D3 (3.56 mm/s) observed here, but a higher IS of 1.47 mm/s (Ono, K., Shinohara, M., Ito, A., Fujita, T. & Ishigaki, A. Mössbauer Study of $FeCl_2 \cdot 4H_2O$ in the Temperature Range 4.2° to 0.025° K. J. Appl. Phys. 39, 1126-1127 (1968)). Based on these results, plus the absence of the $FeCl_2 \cdot 4H_2O$ signal in the XRD pattern of FeNC-CVD-750 (FIG. 12A), it is tentatively assigned, the D3 component in FeNC-CVD-750 to amorphous $FeCl_2 \cdot xH_2O$. This assignment quantitatively agree with the XPS results of ~90% Fe(III) and ~10% Fe(II), and together leads to $U_{Fe}$=~90% and $U_{FeN4}$=100%, and an overall high Fe utilization (U) of ~90%, according to Equation 2.

To further prove this, the electrochemically active Fe content in the FeNC-CVD-750 RDE electrode was determined from the area of the redox peak around 0.66 V, shown in FIG. 7A. These redox peaks, which are absent in the CV of the N—C zeolitic imidazolate framework (N—C trace in FIG. 7A does not have redox peaks), have been previously assigned to the Fe(III)/Fe(II) redox transition of Fe—$N_4$ sites in $H_2SO_4$ solution (Wu, G, et al., 2011). The electroactive Fe content on the RDE electrode was found to be 14.7 μg·$cm^{-2}$. Given the catalyst loading of 800 μg·$cm^{-2}$ and an Fe content of 2.0 wt % for FeNC-CVD-750 (Table 2), the overall utilization (U) of FeNC-CVD-750 is found to be 92% (Equation 6). This value agrees well with the U of ~90% derived from spectroscopic analysis and the aforementioned assignments of D1 to air-accessible Fe—$N_4$ sites and D3 to $FeCl_2$, thereby confirming the full utilization of Fe—$N_4$ sites in FeNC-CVD-750 ($U_{FeN4}$=100%).

To further confirm that all the Fe—$N_4$ sites in FeNC-CVD-750 are electrochemically active during the ORR, in situ XAS was conducted on FeNC-CVD-750 at the Fe K-edge in an $O_2$-purged 0.5 M $H_2SO_4$ electrolyte in a flow cell as a function of applied potential. The XANES and FT-EXAFS spectra collected at 0.9 V nearly overlap that of Fe(III)Pc-$O_2$ (FIG. 7B), which confirms that the vast majority of Fe—$N_4$ sites are in the form of Fe(III)—$N_4$—$O_2$ at 0.9 V (Table 4).

TABLE 4

Summary of the fitting results of the FT-EXAFS spectra collected at the K-edge of the FeNC—CVD-750 ex situ exposed to air or at 0.9 V in $O_2$-saturated 0.5M $H_2SO_4$.

| | R(Å) | N | $\sigma^2 \times 10^{-3}$ (Å2) | $E_0$ (eV) |
|---|---|---|---|---|
| Ex situ | 2.02(1) | 5.9(9) | 6(2) | 0.7(1.0) |
| 0.9 V | 2.00(2) | 6(1) | 6(4) | −1(1) |

In Table, 4, fits were done at the Fe K-edge in R-space, $k^{1,2,3}$ weighting. 1.0<R<2.1 Å and Δk=2.3-11.0 $Å^{-1}$ were used for fitting. $S_0^2$ was fixed at 0.81 obtained by fitting the reference foil. The number given in the parentheses represents the uncertainty of the last digit of the fitting result.

As the potential is gradually reduced to 0.5 V, the XANES spectrum shifts negatively, and correspondingly the intensity of the FT-EXAFS peak drops (FIG. 7C). These occurrences have been commonly observed on Fe—N—C catalysts and ascribed to the redox transition from Fe(III)—$N_4$—$O_2$ to Fe(II)—$N_4$ (Zitolo, A, et al., 2017, Li, J, et al., 2016, Osmieri, L, et al., 2019, Li, J, et al., 2017). However, the FT-EXAFS spectrum at 0.5 V exhibits a shoulder around 1.8 Å, rather than just the one prominent peak observed at 0.9 V (FIG. 7C), and it cannot be fitted with an Fe—$N_4$ model. A recent in situ Mössbauer and XAS study in $H_2SO_4$ solution proposed that as the potential is decreased, the Fe(III)—$N_4$—$O_2$ moiety is converted to Fe(II)—$N_4$ with an axial bond with a sulfate ion, Fe(II)—$N_4$—$SO_4$ (Zelenay, P, Myers, D J, 2020). Accordingly, the Fe species at 0.5 V was assigned to Fe(II)—$N_4$—$SO_4$. The conversion of one Fe species to another with changing potential applied to FeNC-CVD-750 is further confirmed by the existence of isosbestic points at 7132 and 7154 eV in the XANES spectra (FIG. 7B). By taking the XANES spectra at 0.9 V and 0.5 V as standards representing Fe(III)—$N_4$—$O_2$ and Fe(II)—$N_4$—$SO_4$, respectively, the fraction of Fe(III) (ΘFe(III)(E)=Fe(III)/(Fe(III)+Fe(II)); E represents the applied potential) can be acquired by linear combination analysis (LCA) of the in situ XANES spectra. As seen in FIG. 7D, the ΘFe(III)(E) acquired by the LCA closely follows the one calculated from Equation 3 (Gottesfeld, 2014):

$$\Theta_{Fe(III)}(E) = \frac{1}{1 + e^{\frac{-F}{RT}(E - E_{redox})}} \quad \text{Equation 3}$$

In Equation 3, F is the Faraday constant, R is the universal gas constant, T is the temperature, and Eredox is the Fe(II)/Fe(II) redox potential derived from the redox peaks in the CV of FeNC-CVD-750 in deaerated electrolyte (FIG. 7A), 0.66 V. These in situ XAS results thus corroborate full utilization of Fe—$N_4$ sites in FeNC-CVD-750 during the ORR.

The simultaneous achievements of $U_{FeN4}$=100% and $U_{Fe}$=~90% leads to an ultrahigh U of ~90% on FeNC-CVD-750 that meanwhile possesses a relatively high Fe content of 2 wt %. This U is six times higher than that (14.1%) of a state-of-the-art Fe—N—C catalyst with comparable bulk Fe content (2.14 wt %) (Wan, X, et al., 2019). This indicates that the negative correlation between the Fe wt % and U in traditional Fe—N—C catalysts has been substantially alleviated in FeNC-CVD-750 using the CVD method. Consequently, the FeNC-CVD-750 catalyst has a record-high $SD_{mass}$ of $2\times10^{20}$ sites·$g^{-1}$ (Equation 5), which is more than three times higher than the values reported thus far for Fe—N—C catalysts (Wan, X, et al., 2019, Primbs, M, et al., 2020, Luo, F, et al., 2019) and approaching the $SD_{mass}$ of 47% Pt/C ($3.2\times10^{20}$ sites·$g^{-1}$) (Gasteiger, H A, et al., 2005).

For calculations of the $SD_{mass}$ and TOFs of FeNC-CVD-750, the electrochemically active Fe—$N_4$ site density (S.D.) on the RDE electrode of FeNC-CVD-750 is calculated from the electric charge derived from the area of the FeII/FeIII redox peak (Aredox=$2.55\times10^{-4}$ A·V·$cm^{-2}$) in the CV present in FIG. 7A by the following equation:

Equation 4

$$S.D. = \frac{A_{redox}[A\cdot V\cdot \mathrm{cm}^{-2}]\times N_A[\mathrm{atom}\cdot\mathrm{mol}^{-1}]}{W[V\cdot s^{-1}]\times F[s\cdot A\cdot\mathrm{mol}^{-1}]} = 1.6\times10^{17}(\mathrm{sites}\cdot\mathrm{cm}^{-2})$$

assuming one active Fe—$N_4$ site transfer one electron during the Fe(II)/Fe(II) redox transition. $N_A$ IS Avogadro's constant; F is Faraday constant; and W is the scan rate of the CV (0.01 V·$s^{-1}$).

The $SD_{mass}$ of FeNC-CVD-750 is determined by dividing the S.D. by the mass of the FeNC-CVD-750 catalyst on the RDE electrode per electrode area (L=800 μg·$cm^{-2}$ or $8\times10^{-4}$ g·$cm^{-2}$):

Equation 5

$$SD_{mass} = \frac{S.D[\mathrm{sites}\cdot\mathrm{cm}^{-2}]}{L[\mathrm{g}\cdot\mathrm{cm}^{-2}]} = 2\times10^{20}(\mathrm{sites}\cdot\mathrm{g}^{-1})$$

The Fe utilization ($U_{Fe}$) is in turn derived from the S.D. and the Fe loading on the RDE electrode with the following equation:

Equation 6

$$U_{Fe} = \frac{S.D[\mathrm{sites}\cdot\mathrm{cm}^{-2}]\times M_{Fe}[\mathrm{g}\cdot\mathrm{mol}^{-1}]}{L[\mathrm{g}\cdot\mathrm{cm}^{-2}]\times \mathrm{Fe}\ wt\ \%\times N_A[\mathrm{atom}\cdot\mathrm{mol}^{-1}]} = 92\%$$

Wherein $M_{Fe}$ is the molar mass of iron; and the Fe wt % is 2 wt $F_e$ %.

The TOF ($e^-$·$site^{-1}s^{-1}$, at 0.8 V) is calculated from the ik (25 A·$g^{-1}$) at 0.8 V and $SD_{mass}$ based on the following equation:

Equation 7

$$TOF = \frac{i_k @0.8\ \mathrm{V}[A\cdot\mathrm{g}^{-1}]\times N_A[\mathrm{site}\cdot\mathrm{mol}^{-1}]}{SD_{mass}[\mathrm{sites}\cdot\mathrm{g}^{-1}]\times F[s\cdot A\cdot\mathrm{mol}^{-1}]} = 0.78(e^-\cdot\mathrm{site}^{-1}\cdot s^{-1})$$

The TOF of the Fe—$N_4$ sites in FeNC-CVD-750 at 0.8 V is 0.78 $e^-$·$site^{-1}$·$s^{-1}$, as derived from the kinetic current density at 0.8 V and $SD_{mass}$ (Equation 7). This value is comparable to those of previous Fe—N—C catalysts (Zelenay, P, and Myers, D J, 2020; Kramm, U I, et al., 2012), but one order of magnitude lower than that of Pt/C (Paulus, U A, et al., 2002, Gasteiger, et al., 2005). Therefore, the ultra-high kinetic current density of FeNC-CVD-750 is mainly ascribed to the record-high $SD_{mass}$ achieved by CVD, not to a record-high TOF compared to previous state-of-art Fe—N—C catalysts.

Figure 8A:
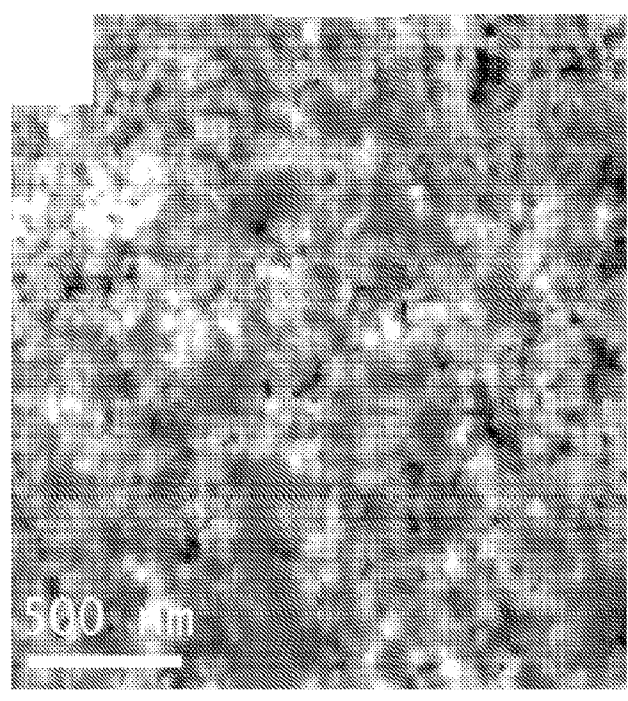
FIG. 8A shows an ADF-STEM image of a FeNC-CVD-750 cathode of the MEA (membrane electrode assembly). The scale bar at lower left is 500 nm.
Figure 8B:
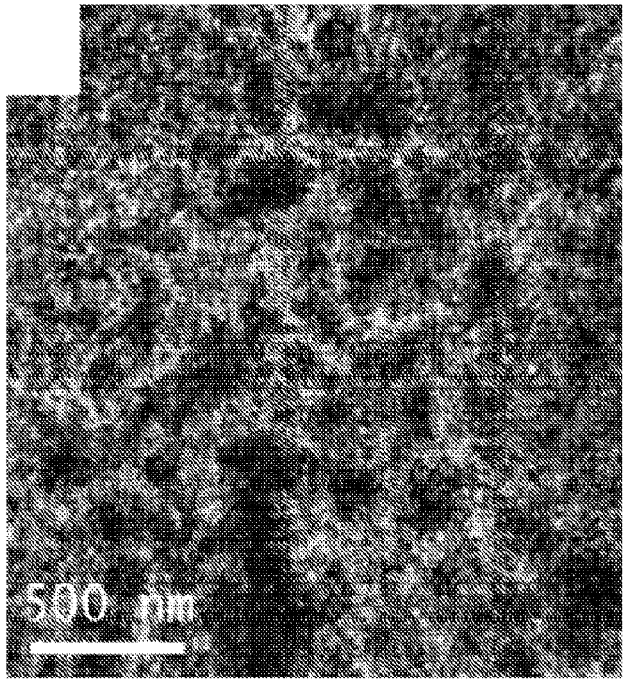
FIG. 8B shows a corresponding energy dispersive X-ray spectroscopy (EDS) spectrum image of the FeNC-CVD-750 cathode of the MEA shown in FIG. 8A. The lighter regions represent the C from the ionomer. The scale bar at lower left is 500 nm.
Figure 8C:
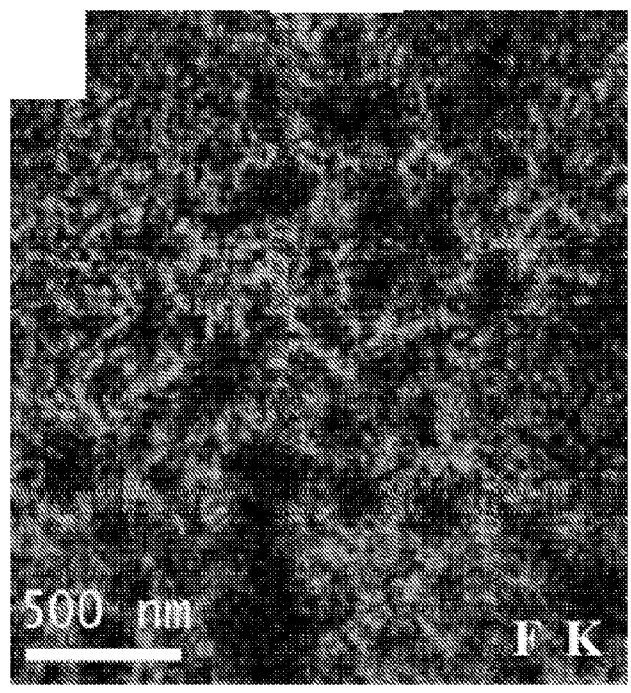
FIG. 8C shows a corresponding EDS spectrum image of the FeNC-CVD-750 cathode of the MEA shown in FIG. 8A. The lighter regions represent the Fe from the ionomer. The scale bar at lower left is 500 nm.
Figure 8D:
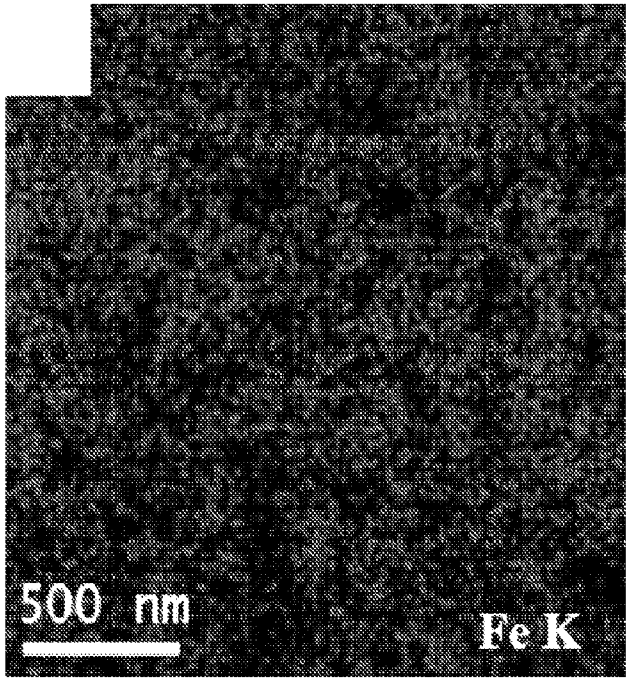
FIG. 8D shows a corresponding EDS spectrum image of the FeNC-CVD-750 cathode of the MEA shown in FIG. 8A. The lighter regions represent the F from the ionomer. The scale bar at lower left is 500 nm.
Figure 14A:
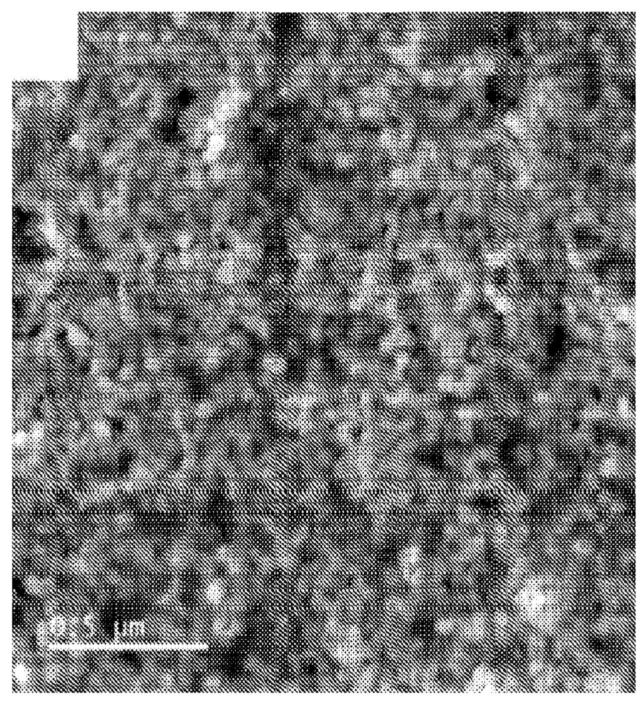
FIG. 14A shows an ADF-STEM image of the cathode of an MEA. The scale bar at lower left is 0.5 micron.
Figure 14B:
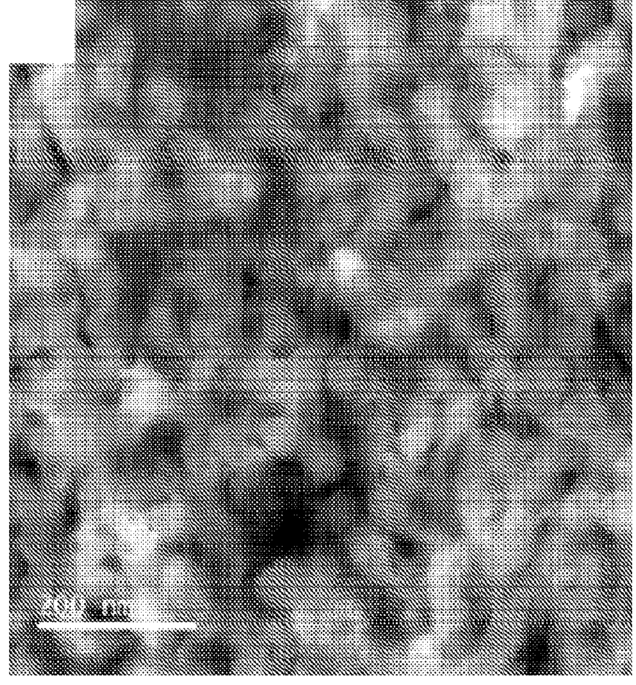
FIG. 14B shows an ADF-STEM image of the cathode of an MEA. The scale bar at lower left is 200 nm.

The high $SD_{mass}$ of FeNC-CVD-750 is necessary for its high performance in an MEA. In addition, the ADF-STEM images of the cathode of the MEA show the preservation of the particle morphology of FeNC-CVD-750 without noticeable agglomeration (FIG. 8A and FIG. 14A). The corresponding overlaid EDS images show relatively uniform distribution of Fe atoms in the electrode and fluorine from the ionomer distributed over the surface of the carbon particles, suggesting these two elements are located in close proximity to one another (FIGS. 8B, 8C, and 8D). These results indicate that the Fe—$N_4$ sites in the cathode are readily accessible to protons. The preservation of the particle morphology of FeNC-CVD-750 in an MEA and the high accessibility of Fe—$N_4$ sites to protons and $O_2$ indicate that its high $SD_{mass}$ can be utilized efficiently, accounting for the exceptional ORR performance of FeNC-CVD-750 in a PEMFC, at both low and high current densities.

Example 5: The Mechanism of the Formation of Fe—$N_4$ Sites by CVD

Next, it was shown that the CVD approach leads to a different Fe—$N_4$ site formation mechanism from the previous synthetic approaches. The background CV of FeNC-CVD-750 is much broader than that of N—C zeolitic imidazolate framework, in addition to the emergence of the Fe(III)/Fe(II) redox peaks (FIG. 7A). The double-layer capacitance of the N—C zeolitic imidazolate framework derived from the CV at 0.3 V is ~0.16 F·$mg^{-1}$. Assuming a specific capacitance of the carbon surface of 204 mF·$m^{-2}$ (Ghoshal, et al., 2016), this corresponds to an electrochemical surface area (ECSA) of ~812 $m^2$·$g^{-1}$. This value matches its Brunauer-Emmett-Teller area of 807 $m^2$·$g^{-1}$. After the CVD at 750° C., the double-layer capacitance markedly increases to ~0.36 F·$mg^{-1}$, corresponding to a high ECSA of ~1800 $m^2$·$g^{-1}$, close to the Brunauer-Emmett-Teller area of ~1593 $m^2$·$g^{-1}$ of FeNC-CVD-750. The differential pore distribution analysis shows a substantial increase in the abundance of both micropores (<2 nm) and mesopores (FIG. 15A) after the CVD.

Figures 15A, 15B:
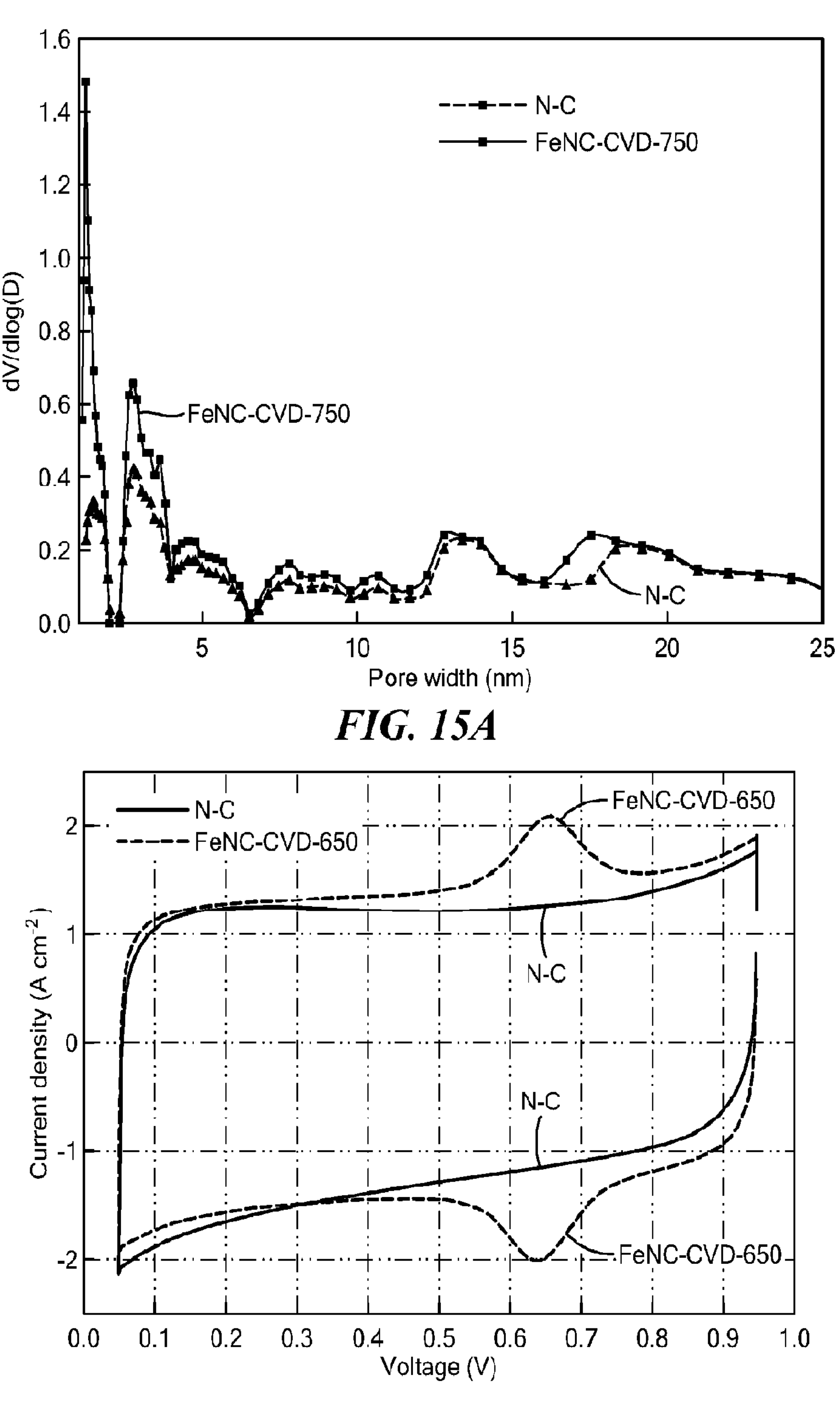
FIG. 15A shows micropore and mesopore size distributions for FeNC-CVD-750 (darker black plot) and N—C zeolitic imidazolate framework (lighter grey plot). The dV/d log (D) is the differential pore volume distribution, where V is pore volume and D is pore diameter.
FIG. 15B shows cyclic voltammograms of the FeNC-CVD-750 (top and bottom traces with the peaks about 0.65V) and N—C zeolitic imidazolate framework (interior traces with no peaks) collected in an Ar-saturated 0.5 M $H_2SO_4$ electrolyte at room temperature with a scan rate of 10 mV·s−1.

The dramatic enhancement of the ECSA of the N—C zeolitic imidazolate framework after the CVD at 750° C. does not occur when the CVD is performed at 650° C. The CV of FeNC-CVD-650 is only slightly broader than that of the N—C zeolitic imidazolate framework (FIG. 15B). In addition, the $SD_{mass}$ of FeNC-CVD-650 derived from the redox peak area (FIG. 15B) is $5\times10^{19}$ sites·$g^{-1}$, much lower than that of FeNC-CVD-750. Meanwhile, the Zn content in FeNC-CVD-650 remains high at ~1.05 wt % (Table 2), much higher than that (0.12 wt %) observed in FeNC-CVD-750. This comparison suggests that the enhancement of the porosity of N—C zeolitic imidazolate framework and the formation of Fe—$N_4$ sites are closely related to the removal of Zn. The substantial loss of Zn upon CVD at 750° C. is not caused by the evaporation of metallic Zn since 750° C. is much lower than the boiling point of Zn (907° C.). Zn evaporation started only above 850° C. in previous syntheses of ZIF-8-derived Fe—N—C catalysts (Zhang, H, et al., 2017, Proietti, E, et al., 2011). It was noted that (1) $ZnCl_2$ has a lower boiling point of 732° C., (2) Zn is nearly completely removed after CVD at 750° C. but not at 650° C., (3) the removal of 2.16 wt % Zn is accompanied by an increase of Fe content by a comparable amount, 2.00 wt % (Table 2), without changing the metal-N XPS peak significantly (FIG.

12B), and (4) both the Zn in the N—C zeolitic imidazolate framework and the Fe in the FeNC-CVD-750 are in the form of Me-$N_4$. These combined results lead to the proposal that the Fe—$N_4$ sites are formed via the following Displacement Reaction 3 during the CVD at 750° C. (FIG. 1A):

$$2FeCl_3\ (g)+2Zn\text{—}N_4\rightarrow 2Fe\text{—}N_4+2ZnCl_2\ (g)+Cl_2\ (g) \quad \text{Reaction 3}$$

According to this Fe—$N_4$ formation mechanism, the penetration of the iron chloride vapor into the N—C zeolitic imidazolate framework plus release of $ZnCl_2$ vapor are responsible for the dramatic enhancement in porosity or ECSA upon the CVD at 750° C. This reaction also rationalizes the optimized temperature of 750° C. for the CVD method. A temperature of 750° C. is marginally higher than the boiling point of $ZnCl_2$ (732° C.), so the $ZnCl_2$ is readily released in the vapor form, thereby promoting the displacement reaction (Reaction 3), forming Fe—$N_4$.

Meanwhile, The Fe—$N_4$ sites are more thermally stable at 750° C. than at higher temperature. This is reflected by the observation that the N content in FeNC-CVD-750 is highly comparable to that of the N—C zeolitic imidazolate framework, but drops precipitously at higher temperatures (Table S2). The rapid drop of the N content in Fe—N—C catalysts with increasing pyrolysis temperature has been commonly observed and regarded as one key factor limiting the Fe—$N_4$ site density (Zhang, H, et al., 2017, Proietti, E, et al., 2011). Therefore, the Fe—$N_4$ sites are better preserved in the synthesis of FeNC-CVD-750 at a temperature approximately 200° C. lower than that (1000±100° C.) utilized for the synthesis of previous state-of-the-art Fe—N—C catalysts.

The displacement reaction (Reaction 3) also accounts for the full utilization of Fe—$N_4$ sites in FeNC-CVD-750. With this mechanism, the Fe—$N_4$ sites are formed at the locations where the Zn—$N_4$ sites are accessible by iron chloride vapor, and thus accessible by air. In addition, the release of $ZnCl_2$ vapor from the formed Fe—$N_4$ sites may further improve their accessibility. In contrast, previous synthesis methods extensively mix Fe, N, and C precursors prior to pyrolysis (FIG. 1B). Consequently, the Fe—$N_4$ moieties are distributed throughout the carbon matrix, whereas only those in the outer-surface region are accessible by air. These Fe—N—C catalysts show both the D1 and D2 spectroscopic signatures in their $^{57}$Fe Mössbauer spectra, in comparable amounts, with D2 recently assigned to Fe(II)—$N_4$ moieties free of adsorbed oxygenated species atop the ferrous central cation (Mineva, T, et al. 2019). These assignments strongly suggest that the D2 signature corresponds to Fe—$N_4$ sites located in the bulk. For example, D2 accounted for 49% and 62% of the relative absorption area of Mössbauer spectra of the ICL and UNM catalysts, the two benchmark Fe—N—C catalysts with the highest $U_{FeN4}$ values (Primbs, M, et al., 2020). Hence, the current state-of-art Fe—N—C catalysts have a $U_{FeN4}$ significantly lower than 100%. Therefore, although full utilization of active sites has long been conceived as a unique advantage of single-atom catalysts, this is the first time it has been realized in Fe—N—C catalysts by resorting to a dual-step synthesis and CVD deposition of Fe.

Collectively, CVD (at 750° C.) possesses two essential advantages compared to previous synthesis approaches for Fe—N—C catalysts: (1) the Fe—$N_4$ sites are formed at a much lower temperature (allowing increased N-content and therefore increased Fe—$N_4$ sites, as well as mitigated Fe clustering) and (2) the Fe—$N_4$ sites are located on the outer-surface of the material with full site utilization ($U_{FeN4}$=100%). Consequently, the FeNC-CVD-750 catalyst possesses a record-high $SD_{mass}$ and ORR performance in $H_2$—$O_2$ PEMFCs. It is also a model catalyst containing only one type of active site. Therefore, model catalyst and practical catalyst for the ORR are combined in a single entity by using the CVD approach. The CVD approach pioneered here is widely applicable to the synthesis of single-atom catalysts with other metals (Mn, Co) and other substrates (metal oxides) for many applications.

Physical Characterizations

- Inductively coupled plasma optical emission spectrometry (ICP-OES): The ICP-OES tests were conducted at Robertson Microlit Laboratories.
- TEM: Transmission electron microscope (TEM) image of the ZIF-8 was conducted on a JEOL 2010 field emission gun (FEG).
- STEM: Aberration-corrected scanning transmission electron microscopy (AC-STEM) was conducted using a JEOL NEOARM TEM/STEM operated at 80 keV and equipped with a Gatan Quantum electron energy loss spectrometer and dual 100 $m^2$ silicon drift detectors for energy dispersive X-ray spectroscopy.
- SEM: Scanning electron microscopy (SEM) micrographs of N—C zeolitic imidazolate framework were obtained with a Hitachi S-4800 apparatus (Hitachi, Tokyo, Japan).
- XRD: X-ray diffraction (XRD) patterns were conducted using a PANanalytical X'Pert Pro powder X-ray diffractometer with Cu $K_\alpha$ radiation.
- XPS: X-ray photoelectron spectroscopy (XPS) tests were done with Kratos AXIS Ultra DLD spectrometer with Al Kα (1486.6 eV) X-ray source at UCLA.
- $N_2$ adsorption/desorption analysis: $N_2$ sorption analysis was performed at liquid nitrogen temperature (77 K) with a Micromeritics ASAP 2020 instrument. Prior to the measurements, all samples were degassed at 200° C. for 5 h in flowing nitrogen to remove guest molecules or moisture. The pore size distributions were calculated by fitting the full isotherm with the quench solid density functional theory model with slit pore geometry from NovaWin (Quantachrome Instruments).
- Mössbauer spectroscopy: $^{57}$Fe Mössbauer spectroscopy was used to obtain information on iron speciation. Samples of ~300 mg were mounted in a 2 $cm^2$ holder. Mössbauer spectra were measured at 5 K in a helium flow cryostat (SHI-850 Series from Janis, USA). The Mössbauer spectrometer (Wissel, Germany) was operated in the transmission mode with a $^{57}$Co: Rh source at room temperature. The velocity driver was operated in the constant acceleration mode with a triangular velocity waveform. The velocity scale was calibrated with the magnetically split sextet of a high-purity α-Fe foil at room temperature. The spectra were fitted to appropriate combinations of Lorentzian profiles representing quadrupole doublets and sextets by least-squares methods. Isomer shifts are given relative to α-Fe at room temperature.
- XAS measurements. The ex situ XAS measurements at the Zn K-edge of Zn(II)Pc, ZIF-8, and N—C zeolitic imidazolate framework were performed in transmission mode at beamline 10-ID of the Materials Research Collaborative Access Team (MRCAT) at the Advanced Photon Source, Argonne National Laboratory, Lemont, Illinois, United States. Ex situ XAS measurements at the Fe K-edge of Fe-based catalysts were conducted at beamline ISS 6-EM and 8-ID in fluorescence mode in National Synchrotron Light Source II (NSLS-II) (Brookhaven National Laboratory, NY). In addition, in situ XAS measurements were conducted on FeNC-CVD-750. The ink for the XAS electrode was composed of 1:3 (wt %) 18.2 MO purity deionized water (Millipore) and 2-propanol (HPLC-grade, Aldrich), a 5 wt % Nafion solution (Aldrich), and FeNC-CVD-750 catalyst powder. The inks were directly sprayed onto a Zoltek® carbon cloth on a piece of heated glass. The final Fe loading is ~0.05 mgFe·cm− 2 in the electrodes ($1\times3$ $cm^2$). Ex situ XAS data were firstly collected on the dry electrode, which was then conditioned in 0.5 M $H_2SO_4$ under vacuum for three hours to remove the oxides, impurities, and gases trapped inside the electrode, and to thoroughly wet the electrodes. Afterwards, the electrode was mounted onto a electrochemical half-cell reported previously (Newville, 2001) and further conditioned electrochemically for 50 cycles between 0.05 and 0.95 V with a scan rate of 50 mV $s^{-1}$ in $N_2$-saturated 0.5 M $H_2SO_4$ electrolyte. Full range Fe K-edge spectra were taken at various static potentials along the anodic sweep of the cyclic voltammetry (CV) in $O_2$-saturated 0.5 M $H_2SO_4$ electrolyte. Data were collected in fluorescence mode with a Fe reference foil positioned between 12 and 13 as a reference. The voltage cycling limits were 0.50 to 0.95 V vs. RHE. The XAS data were processed and fitted using the Ifeffit-based Athena and Artemis programs (Ankudinov, A L, et al., 1998). Scans were calibrated, aligned, and normalized with background removed using the IFEFFIT suite (47). The X(R) were modeled using single scattering paths calculated by FEFF6 (from the IFEFFIT interactive XAFS Analysis suite, Newville, 2001).

REFERENCES

Yoshida, T; K. Kojima, Toyota MIRAI fuel cell vehicle and progress toward a future hydrogen society. *Electrochem Soc Interface* 24, 45-49 (2015).

Thompson, S T; James, B D; J. M. Huya-Kouadio, C. Houchins, D. A. DeSantis, R. Ahluwalia, A. R. Wilson, G. Kleen, D. Papageorgopoulos, Direct hydrogen fuel cell electric vehicle cost analysis: system and high-volume manufacturing description, validation, and outlook. *J. Power Sources* 399, 304-313 (2018).

Thompson, S T; Wilson, A R; P. Zelenay, D. J. Myers, K. L. More, K. C. Neyerlin, D. Papageorgopoulos, ElectroCat: DOE's approach to PGM-free catalyst and electrode R&D. *Solid State Ion.* 319, 68-76 (2018).

Chung, H T; D. A. Cullen, D. Higgins, B. T. Sneed, E. F. Holby, K. L. More, P. Zelenay, Direct atomic-level insight into the active sites of a high-performance PGM-free ORR catalyst. *Science* 357, 479-484 (2017).

Li, J; M. Chen, D. A. Cullen, S. Hwang, M. Wang, B. Li, K. Liu, S. Karakalos, M. Lucero, H. Zhang, C. Lei, H. Xu, G. E. Sterbinsky, Z. Feng, D. Su, K. L. More, G. Wang, Z. Wang, G. Wu, Atomically dispersed manganese catalysts for oxygen reduction in proton-exchange membrane fuel cells. *Nat. Catal.* 1, 935-945 (2018).

Zitolo, A; N. Ranjbar-Sahraie, T. Mineva, J. Li, Q. Jia, S. Stamatin, G. F. Harrington, S. M. Lyth, P. Krtil, S. Mukerjee, E. Fonda, F. Jaouen, Identification of catalytic sites in cobalt-nitrogen-carbon materials for the oxygen reduction reaction. *Nat. Commun.* 8, 957 (2017).

Zhang, H; S. Hwang, M. Wang, Z. Feng, S. Karakalos, L. Luo, Z. Qiao, X. Xie, C. Wang, D. Su, Y. Shao, G. Wu, Single atomic iron catalysts for oxygen reduction in acidic media: particle size control and thermal activation. *J. Am. Chem. Soc.* 139, 14143-14149 (2017).

Lefevre, M; E. Proietti, F. Jaouen, J. P. Dodelet, Iron-based catalysts with improved oxygen reduction activity in polymer electrolyte fuel cells. *Science* 324, 71-74 (2009).

Proietti, E; F. Jaouen, M. Lefevre, N. Larouche, J. Tian, J. Herranz, J. P. Dodelet, Iron-based cathode catalyst with enhanced power density in polymer electrolyte membrane fuel cells. *Nat. Commun.* 2, 416 (2011).

Banham, D; T. Kishimoto, Y. Zhou, T. Sato, K. Bai, J. i. Ozaki, Y. Imashiro, S. Ye, Critical advancements in achieving high power and stable nonprecious metal catalyst-based MEAs for real-world proton exchange membrane fuel cell applications. *Sci. Adv.* 4, 7180 (2018).

Serov, A; K. Artyushkova, E. Niangar, C. Wang, N. Dale, F. Jaouen, M. T. Sougrati, Q. Jia, S. Mukerjee, P. Atanassov, Nano-structured non-platinum catalysts for automotive fuel cell application. *Nano Energy* 16, 293-300 (2015).

Wan, X; X. Liu, Y. Li, R. Yu, L. Zheng, W. Yan, H. Wang, M. Xu, J. Shui, Fe—N—C electrocatalyst with dense active sites and efficient mass transport for high-performance proton exchange membrane fuel cells. *Nat. Catal.* 2, 259-268 (2019).

Tylus, U; Q. Jia, K. Strickland, N. Ramaswamy, A. Serov, P. Atanassov, S. Mukerjee, Elucidating oxygen reduction active sites in pyrolyzed metal-nitrogen coordinated non-precious-metal electrocatalyst systems. *J. Phys. Chem. C* 118, 8999-9008 (2014).

Li, J; S. Ghoshal, W. Liang, M. T. Sougrati, F. Jaouen, B. Halevi, S. McKinney, G. McCool, C. Ma, X. Yuan, Z. F. Ma, S. Mukerjee, Q. Jia, Structural and mechanistic basis for the high activity of Fe—N—C catalysts toward oxygen reduction. *Energy Environ. Sci.* 9, 2418-2432 (2016).

Zhang, H; H. T. Chung, D. A. Cullen, S. Wagner, U. I. Kramm, K. L. More, P. Zelenay, G. Wu, High-performance fuel cell cathodes exclusively containing atomically dispersed iron active sites. *Energy Environ. Sci.* 12, 2548-2558 (2019).

Gupta, S; D. Tryk, I. Bae, W. Aldred, E. Yeager, Heat-treated polyacrylonitrile-based catalysts for oxygen electroreduction. *J. Appl. Electrochem.* 19, 19-27 (1989).

Li, J; L. Jiao, E. Wegener, L. L. Richard, E. Liu, A. Zitolo, M. T. Sougrati, S. Mukerjee, Z. Zhao, Y. Huang, F. Yang, S. Zhong, H. Xu, A. J. Kropf, F. Jaouen, D. J. Myers, Q. Jia, Evolution pathway from iron compounds to Fe1(II)—$N_4$ sites through gas-phase iron during pyrolysis. *J. Am. Chem. Soc.* 142, 1417-1423 (2020).

Mineva, T; 1. Matanovic, P. Atanassov, M. T. Sougrati, L. Stievano, M. Clémancey, A. Kochem, J. M. Latour, F. Jaouen, Understanding active sites in pyrolyzed Fe—N—C catalysts for fuel cell cathodes by bridging density functional theory calculations and $^{57}$Fe mössbauer spectroscopy. *ACS Catal.* 9, 9359-9371 (2019).

Zitolo, A; V. Goellner, V. Armel, M. T. Sougrati, T. Mineva, L. Stievano, E. Fonda, F. Jaouen, Identification of catalytic sites for oxygen reduction in iron- and nitrogen-doped graphene materials. *Nat. Mater.* 14, 937 (2015).

Primbs, M; Sun, Y.; Roy, A.; Malko, D.; Mehmood, A.; Sougrati, M. T.; Blanchard, P. Y.; Granozzi, G.; Kosmala, T.; Daniel, G.; Atanassov, P.; Sharman, J.; Durante, C.; Kucernak, A.; Jones, D.; Jaouen, F.; Strasser, P. Establishing reactivity descriptors for platinum group metal (PGM)-free Fe—N—C catalysts for PEM fuel cells. *Energy Environ. Sci.* 2020, 13, 2480-2500.

Paulus, U A; A. Wokaun, G. G. Scherer, T. J. Schmidt, V. Stamenkovic, N. M. Markovic, P. N. Ross, Oxygen reduction on high surface area Pt-based alloy catalysts in comparison to well defined smooth bulk alloy electrodes. *Electrochim. Acta* 47, 3787-3798 (2002).

Gasteiger, H A; S. S. Kocha, B. Sompalli, F. T. Wagner, Activity benchmarks and requirements for Pt, Pt-alloy, and non-Pt oxygen reduction catalysts for PEMFCs. *Appl. Catal. B-Environ.* 56, 9-35 (2005).

Luo, F; A. Roy, L. Silvioli, D. A. Cullen, A. Zitolo, M. T. Sougrati, I. C. Oguz, T. Mineva, D. Teschner, S. Wagner, J. Wen, F. Dionigi, U. 1. Kramm, J. Rossmeisl, F. Jaouen, P. Strasser, P-block single-metal-site tin/nitrogen-doped carbon fuel cell cathode catalyst for oxygen reduction reaction. *Nat. Mater*., (2020). doi.org/10.1038/s41563-$O_{20}$-0717-5.

Artyushkova, K, Misconceptions in interpretation of nitrogen chemistry from x-ray photoelectron spectra. *J. Vac. Sci. Technol. A* 38, 031002 (2020).

Li, J; Pršlja, P; T. Shinagawa, A. J. Martin Fernández, F. Krumeich, K. Artyushkova, P. Atanassov, A. Zitolo, Y. Zhou, R. Garcia-Muelas, N. López, J. Pérez-Ramirez, F. Jaouen, Volcano trend in electrocatalytic $CO_2$ reduction activity over atomically dispersed metal sites on nitrogen-doped carbon. *ACS Catal.* 9, 10426-10439 (2019).

Kanari, N; D. Mishra, L. Filippov, F. Diot, J. Mochón, E. Allain, Kinetics of hematite chlorination with Cl2 and Cl2+O2: Part 1. Chlorination with Cl2. *Thermochim. Acta* 497, 52-59 (2010).

Rustad, D S; N. W. Gregory, Vapor pressure of iron(III) chloride. *J. Chem. Eng.* 28, 151-155 (1983).

Beltren, D E; S. Litster, Half-wave potential or mass activity? characterizing platinum group metal-free fuel cell catalysts by rotating disk electrodes. *ACS Energy Lett.* 4, 1158-1161 (2019).

Osmieri, L; R. K. Ahluwalia, X. Wang, H. T. Chung, X. Yin, A. J. Kropf, J. Park, D. A. Cullen, K. L. More, P. Zelenay, D. J. Myers, K. C. Neyerlin, Elucidation of Fe—N C electrocatalyst active site functionality via in-situ X-ray absorption and operando determination of oxygen reduction reaction kinetics in a PEFC. *Appl. Catal. B-Environ.* 257, 117929 (2019).

Li, J; A. Alsudairi, Z. F. Ma, S. Mukerjee, Q. Jia, Asymmetric volcano trend in oxygen reduction activity of Pt and non-Pt catalysts: in situ identification of the site-blocking effect. *J. Am. Chem. Soc.* 139, 1384-1387 (2017).

Shao, Y; J. P. Dodelet, G. Wu, P. Zelenay, PGM-free cathode catalysts for PEM fuel cells: a mini-review on stability challenges. *Adv. Mater.* 31, 1807615 (2019).

Osmieri, L; D. A. Cullen, H. T. Chung, R. K. Ahluwalia, K. C. Neyerlin, Durability evaluation of a Fe—N—C catalyst in polymer electrolyte fuel cell environment via accelerated stress tests. *Nano Energy* 78, 105209 (2020).

Osmieri, L; Park, J; D. A. Cullen, P. Zelenay, D. J. Myers, K. C. Neyerlin, Status and Challenges for the application of platinum group metal-free catalysts in proton exchange membrane fuel cells. *Current Opinion in Electrochemistry*, (2020). DOI: 10.1016/j.coelec.2020.08.009.

Li, J; Jia, Q; S. Mukerjee, M. T. Sougrati, G. Drazic, A. Zitolo, F. Jaouen, The challenge of achieving a high density of Fe-based active sites in a highly graphitic carbon matrix. *Catalysts* 9, 144 (2019).

Menga, D; F. Ruiz-Zepeda, L. Moriau, M. Šala, F. Wagner, B. Koyutürk, M. Bele, U. Petek, N. Hodnik, M. Gaberšček, T. P. Fellinger, Active-site imprinting: preparation of Fe—N—C catalysts from zinc ion-templated ionothermal nitrogen-doped carbons. *Adv. Energy Mater.* 9, 1902412 (2019).

Birchall, T, An investigation of some iron halide complexes by Mössbauer spectroscopy. *Can. J. Chem.* 47, 1351-1354 (1969).

Wang, Z D; M. Inagaki, M. takano, Moessbauer study of iron chloride-graphite intercalation compounds synthesized in molten salt. *Carbon* 29, 423-427 (1991).

Wu, G; K. L. More, C. M. Johnston, P. Zelenay, High-performance electrocatalysts for oxygen reduction derived from polyaniline, iron, and cobalt. *Science* 332, 443-447 (2011).

Arruda, T M; B. Shyam, J. S. Lawton, N. Ramaswamy, D. E. Budil, D. E. Ramaker, S. Mukerjee, Fundamental aspects of spontaneous cathodic deposition of Ru onto Pt/c electrocatalysts and membranes under direct methanol fuel cell operating conditions: an in situ X-ray absorption spectroscopy and electron spin resonance study. *J. Phys. Chem. C* 114, 1028-1040 (2010).

Zelenay, P; and D. J. Myers, "ElectroCat (Electrocatalysis Consortium)", 2020 Department of Energy Hydrogen and Fuel Cells Program 2020 Annual Merit Review and Peer Evaluation Meeting, Washington D. C., 2020. hydrogen.energy.gov/pdfs/review20/fcl60_myers_zelenay_2020_o.pdf Gottesfeld, S; Generation of active sites by potential-driven surface processes: a central aspect of electrocatalysis. *ECS Trans* 61, 1-13 (2014).

Luo, F; C. H. Choi, M. J. M. Primbs, W. Ju, S. Li, N. D. Leonard, A. Thomas, F. Jaouen, P. Strasser, Accurate evaluation of active-site density (SD) and turnover frequency (TOF) of PGM-free metal-nitrogen-doped carbon (MNC) electrocatalysts using CO cryo adsorption. *ACS Catal.* 9, 4841-4852 (2019).

Kramm, U I; J. Herranz, N. Larouche, T. M. Arruda, M. Lefevre, F. Jaouen, P. Bogdanoff, S. Fiechter, I. Abs-Wurmbach, S. Mukerjee, J. P. Dodelet, Structure of the catalytic sites in Fe/N/C-catalysts for O2-reduction in PEM fuel cells. *Phys. Chem. Chem. Phys.* 14, 11673-11688 (2012).

Jia, Q; W. Liang, M. K. Bates, P. Mani, W. Lee, S. Mukerjee, Activity descriptor identification for oxygen reduction on platinum-based bimetallic nanoparticles: in situ observation of the linear composition-strain-activity relationship. *ACS Nano* 9, 387400 (2015).

Newville, M; IFEFFIT: interactive XAFS analysis and FEFF fitting. *J. Synchrotron Radiat.* 8, 322-324 (2001).

Ankudinov, A L; B. Ravel, J. J. Rehr, S. D. Conradson, Real-space multiple-scattering calculation and interpretation of x-ray-absorption near-edge structure. *Phys. Rev. B* 58, 7565-7576 (1998).

The invention claimed is:

1. An Fe—N—C catalyst comprising N—C sites and Fe atoms;

wherein at least 90% of the Fe atoms in the Fe—N—C catalyst are in Fe—N4 moieties;

wherein the ratio of Fe—N4 moieties located at an exterior surface of the Fe—N—C catalyst to the Fe—N4 moieties located within the Fe—N—C catalyst is about 100:1; and wherein at least about 99% of the N—C sites at the exterior surface of the Fe—N—C catalyst are bound to Fe.

2. The Fe—N—C catalyst of claim 1, wherein the Fe—N—C catalyst comprises not less than about 2 weight % of Fe relative to the total weight of the Fe—N—C catalyst.

3. The Fe—N—C catalyst of claim 1, wherein at least about 99% of the Fe—N4 moieties are accessible by a gas-phase contacting the catalyst.

4. The Fe—N—C catalyst of claim 1, wherein the electrochemical surface area of the Fe—N—C catalyst is not less than about 1800 $m^2/g$.

5. The Fe—N—C catalyst of claim 1, wherein the catalyst is capable of providing an IR-corrected current ≥33 mA/$cm^2$ at 0.90 V when used in a proton exchange membrane fuel cell.

6. A cathode for a fuel cell comprising the catalyst of claim 1.

7. The cathode of claim 6, wherein the fuel cell is a proton exchange membrane fuel cell.

8. The cathode of claim 7, wherein the proton exchange membrane fuel cell is capable of an oxygen reduction reaction activity of ≥44 mA/$cm^2$ at 0.89 VIR-corrected.

* * * * *